US012769047B2

(12) United States Patent
Van Bommel et al.

(10) Patent No.: US 12,769,047 B2
(45) Date of Patent: Oct. 20, 2026

(54) DOWNLIGHT WITH A SHALLOW REFLECTOR AND LIGHTGUIDE PANEL

(71) Applicant: SIGNIFY HOLDING B.V., Eindhoven (NL)

(72) Inventors: Ties Van Bommel, Horst (NL); Rifat Ata Mustafa Hikmet, Eindhoven (NL); Johannes Petrus Maria Ansems, Hulsel (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 19/147,736

(22) PCT Filed: Jan. 9, 2024

(86) PCT No.: PCT/EP2024/050393
§ 371 (c)(1),
(2) Date: Jul. 14, 2025

(87) PCT Pub. No.: WO2024/149757
PCT Pub. Date: Jul. 18, 2024

(65) Prior Publication Data
US 2026/0227563 A1 Aug. 6, 2026

(30) Foreign Application Priority Data
Jan. 12, 2023 (EP) .................................... 23151259

(51) Int. Cl.
*F21V 8/00* (2006.01)

(52) U.S. Cl.
CPC .................................. *G02B 6/0055* (2013.01)

(58) Field of Classification Search
CPC ............................................. G02B 6/00-0096
See application file for complete search history.

(56) References Cited

U.S. PATENT DOCUMENTS 10,066,793 B2 * 9/2018 Cornelissen .............. F21K 9/61
2013/0063980 A1 3/2013 Ender
(Continued)

FOREIGN PATENT DOCUMENTS

CN 206469092 U 9/2017
CN 113217841 A 8/2021
WO 2019008092 A1 1/2019

*Primary Examiner* — Jason M Han

(57) ABSTRACT

The invention provides a light generating system (1000) comprising a light generating device (100), a lightguide (400), and a light collimating reflector (200), wherein the light generating device (100) is configured to generate device light (101); wherein the light generating device (100) comprises a solid state light source; wherein the lightguide (400) comprises a first lightguide face (410), a second lightguide face (420), and a side face (430) bridging the first lightguide face (410) and the second lightguide face (420); wherein the lightguide (400) comprises light outcoupling elements (600) (comprised by one or more of lightguide faces (410,420) and/or arranged in the lightguide (400)); wherein the first lightguide face (410) comprises a surface area A1; the first lightguide face (410) comprises (a) an inner surface part (455), having an inner surface area A11, and (b) an outer surface part (465), surrounding the inner surface part (455), (the outer surface part (465)) having an outer surface area A12; wherein the outer surface area A12 is at maximum 40% of the surface area A1; wherein the light generating device (100) and the lightguide (400) are configured such that (i) device light (101) enters the lightguide (400) via the side face (430), to provide incoupled device light (102), wherein the lightguide (400) is configured to guide at least part of the incoupled device light (102) via total internal reflection; and (ii) at least part of the incoupled device light (102) is coupled out from the lightguide (400) via the first lightguide face (410) to provide outcoupled device light (103), wherein (the light outcoupling elements
(Continued)

(600) are configured such that) more than 50% of the outcoupled device light (103) is coupled out via the outer surface part (465); and wherein the light collimating reflector (200) comprises a first reflector side (220), a second reflector side (230), and a reflector wall (210) tapering from the first reflector side (220) to the second reflector side (230); wherein the first reflector side (220) is configured further away from the first lightguide face (410) than the second reflector side (230); and wherein the light collimating reflector (200) is configured to beamshape the outcoupled device light (103) emanating from the first lightguide face (410).

15 Claims, 9 Drawing Sheets

(56) References Cited

U.S. PATENT DOCUMENTS

| | | | |
|---|---|---|---|
| 2017/0175955 | A1 | 6/2017 | Cornelissen |
| 2018/0258345 | A1 | 9/2018 | Peeters |
| 2022/0026052 | A1 | 1/2022 | Keller et al. |

* cited by examiner

DOWNLIGHT WITH A SHALLOW REFLECTOR AND LIGHTGUIDE PANEL

CROSS-REFERENCE TO PRIOR APPLICATIONS

This application is the U.S. National Phase application under 35 U.S.C. § 371 of International Application No. PCT/EP2024/050393, filed on Jan. 9, 2024, which claims the benefit of European Patent Application No. 23151259.1, filed on Jan. 12, 2023. These applications are hereby incorporated by reference herein.

FIELD OF THE INVENTION

The invention relates to a light generating system. The invention further relates to a lighting device.

BACKGROUND OF THE INVENTION

Light generating systems are known in the art. For instance CN113217841A describes a side light-emitting lamp without a lightguide plate. The lamp comprises a shell provided with a mounting slot hole, an LED lamp source arranged in the shell, a first optical device arranged at the bottom of the mounting slot hole of the shell, and a light-transmitting second optical device. The second optical device is arranged above the first optical device to form an optical cavity with the first optical device, the LED lamp source is arranged on the side surface of the optical cavity, the first optical device comprises a mirror reflection layer and a plurality of diffuse reflection units arranged on the mirror reflection layer at intervals, and the diffuse reflection units are gradually dense in the direction away from the LED lamp source. The light directly penetrating through the second optical device once and the light subjected to mirror reflection and diffuse reflection of the first optical device penetrate through the second optical device again and are reflected, refracted and mixed in an air layer on the outer side of the second optical device to form uniform emergent light so that a lightguide plate component can be omitted, the cost is reduced, the weight of the lamp is reduced, meanwhile, the light utilization rate is high, and light emitting uniformity is good.

SUMMARY OF THE INVENTION

For general lighting, lightguide panels (LGP) may be used to provide light. A LGP based luminaire may comprise a lightguide arranged with a reflector and a pump light source configured to pump the lightguide panel. Such arrangement may e.g. be applied as downlights. Downlights are the dominant lighting design in many application areas such as retail and shops. However, the spatial light distributions of such arrangements appear to be limited. For instance, the angular distribution of the light may be relatively broad which may imply the need for relatively bulky optics.

Hence, it is an aspect of the invention to provide an alternative light generating system, which preferably further at least partly obviates one or more of above-described drawbacks. The present invention may have as object to overcome or ameliorate at least one of the disadvantages of the prior art, or to provide a useful alternative.

According to a first aspect, the invention provides a light generating system ("system") comprising a light generating device, a lightguide, and a light collimating reflector ("reflector"). Here, the light collimating reflector may also be referred to as a reflector. In embodiments, the light generating device may be configured to generate device light. Especially, the light generating device may comprise a solid state light source. In embodiments, the lightguide may comprise a first lightguide face, a second lightguide face, and a side face. Especially, the side face may bridge the first lightguide face and the second lightguide face. In embodiments, the lightguide may comprise light outcoupling elements (comprised by one or more of lightguide faces and/or arranged in the lightguide). Further, in embodiments, the first lightguide face may comprise a surface area A1. Especially, the first lightguide face may comprise an inner surface part having an inner surface area A11, and an outer surface part (surrounding the inner surface part) having an outer surface area A12. In embodiments, the outer surface area A12 may be at maximum 10%, such as 20%, especially 40% of the surface area A1. In embodiments, the light generating device and the lightguide may be configured such that the device light enters the lightguide via the side face, to provide incoupled device light. Especially, the lightguide may be configured to guide at least part of the incoupled device light via total internal reflection. Further, at least part of the incoupled device light may especially be coupled out from the lightguide via the first lightguide face to provide outcoupled device light. In embodiments, the light outcoupling elements may be configured such that more than 40%, such as more than 50%, especially more than 60% of the outcoupled device light is coupled out via the outer surface part. The light collimating reflector may comprise a first reflector side, a second reflector side, and a reflector wall. Especially, the reflector wall may taper from the first reflector side to the second reflector side. The first reflector side may be configured further away from the first lightguide face than the second reflector side. The light collimating reflector may in embodiments be configured to beamshape the outcoupled device light emanating from the first lightguide face. The collimating reflector comprises a locus of foci, wherein a projection of the locus (700) of foci (F) on a plane through the first lightguide face (410) lies on the outer surface part (465). In embodiments, the light collimating reflector may comprise an optical axis ($O_R$). In specific embodiments, the light collimating reflector may comprise a locus of foci (F) surrounding the optical axis ($O_R$). More especially, a projection of the locus on a plane through the first lightguide face may lie closer to the outer surface part than to optical axis ($O_R$).

Hence, in specific embodiments, the invention provides a light generating system comprising a light generating device, a lightguide, and a reflector, wherein the light generating device is configured to generate device light, wherein the light generating device comprises a solid state light source, wherein the lightguide comprises a first lightguide face, a second lightguide face, and a side face bridging the first lightguide face and the second lightguide face, wherein the lightguide comprises light outcoupling elements (comprised by one or more of lightguide faces and/or arranged in the lightguide), wherein the first lightguide face comprises a surface area A1, wherein the first lightguide face comprises (a) an inner surface part, having an inner surface area A11, and (b) an outer surface part, surrounding the inner surface part, (the outer surface part) having an outer surface area A12, wherein the outer surface area A12 is at maximum 40% of the surface area A1, wherein the light generating device and the lightguide are configured such that (i) device light enters the lightguide via the side face, to provide incoupled device light, wherein the lightguide is configured to guide at least part of the incoupled device light via total internal reflection, and (ii) at least part of the incoupled device light is coupled out from the lightguide via the first lightguide face to provide outcoupled device light, wherein the light outcoupling elements are configured such that more than 50% of the outcoupled device light is coupled out via the outer surface part, and wherein the reflector comprises a first reflector side, a second reflector side, and a reflector wall tapering from the first reflector side to the second reflector side, wherein the first reflector side is configured further away from the first lightguide face than the second reflector side, and wherein the reflector is configured to beamshape the outcoupled device light emanating from the first lightguide face.

Hence, the invention may e.g. provide a downlight with a (shallow) reflector and a lightguide (or lightguide panel), while providing a beam of light having a relatively narrow beam width. Hence, surprisingly it appears that when offering a specific inhomogeneous radiant flux to the (shallow) reflector, a relatively narrow beam of light may be generated, whereas would a relatively homogenous radiant flux be provided, a broader beam would be obtained.

As mentioned above, the light generating system may comprise a light generating device, a lightguide, and a reflector. These will be further elucidated below.

In embodiments, the light generating device may be configured to generate device light. In embodiments, the light generating device may comprise a light source. Especially, the light generating device may comprise a solid state light source.

The term "light source" may in principle relate to any light source known in the art. It may be a conventional (tungsten) light bulb, a low pressure mercury lamp, a high pressure mercury lamp, a fluorescent lamp, an LED (light emissive diode). In a specific embodiment, the light source comprises a solid state LED light source (such as an LED or laser diode (or "diode laser")). The term "light source" may also relate to a plurality of light sources, such as 2-2000 (solid state) LED light sources. Hence, the term LED may also refer to a plurality of LEDs. Further, the term "light source" may in embodiments also refer to a so-called chip-on-board (COB) light source. The term "COB" especially refers to LED chips in the form of a semiconductor chip that is neither encased nor connected but directly mounted onto a substrate, such as a PCB. Hence, a plurality of light emitting semiconductor light source may be configured on the same substrate. In embodiments, a COB is a multi LED chip configured together as a single lighting module.

The term "light source" may also refer to a chip scaled package (CSP). A CSP may comprise a single solid state die with provided thereon a luminescent material comprising layer. The term "light source" may also refer to a midpower package. A midpower package may comprise one or more solid state die(s). The die(s) may be covered by a luminescent material comprising layer. The die dimensions may be equal to or smaller than 2 mm, such as in the range of e.g. 0.2-2 mm. Hence, in embodiments the light source comprises a solid state light source. Further, in specific embodiments, the light source comprises a chip scale packaged LED. Herein, the term "light source" may also especially refer to a small solid state light source, such as having a mini size or micro size. For instance, the light sources may comprise one or more of mini LEDs and micro LEDs. Especially, in embodiment the light sources comprise micro LEDs or "microLEDs" or "μLEDs". Herein, the term mini size or mini LED especially indicates to solid state light sources having dimensions, such as die dimension, especially length and width, selected from the range of 100 μm-1 mm. Herein, the term u size or micro LED especially indicates to solid state light sources having dimensions, such as die dimension, especially length and width, selected from the range of 100 μm and smaller.

The light source may have a light escape surface. Referring to conventional light sources such as light bulbs or fluorescent lamps, it may be an outer surface of a glass or a quartz envelope. For LED's it may for instance be the LED die, or when a resin is applied to the LED die, the outer surface of the resin. In principle, it may also be the terminal end of a fiber. The term escape surface especially relates to that part of the light source, where the light actually leaves or escapes from the light source. The light source is configured to provide a beam of light. This beam of light (thus) escapes from the light exit surface of the light source.

Likewise, a light generating device may comprise a light escape surface, such as an end window. Further, likewise a light generating system may comprise a light escape surface, such as an end window.

The term "light source" may refer to a semiconductor light-emitting device, such as a light emitting diode (LEDs), a resonant cavity light emitting diode (RCLED), a vertical cavity laser diode (VCSELs), an edge emitting laser, etc. The term "light source" may also refer to an organic light-emitting diode (OLED), such as a passive-matrix (PMOLED) or an active-matrix (AMOLED). In a specific embodiment, the light source comprises a solid-state light source (such as an LED or laser diode). In an embodiment, the light source comprises an LED (light emitting diode). The terms "light source" or "solid state light source" may also refer to a superluminescent diode (SLED).

The term LED may also refer to a plurality of LEDs.

The term "light source" may also relate to a plurality of (essentially identical (or different)) light sources, such as 2-2000 solid state light sources. In embodiments, the light source may comprise one or more micro-optical elements (array of micro lenses) downstream of a single solid-state light source, such as an LED, or downstream of a plurality of solid-state light sources (i.e. e.g. shared by multiple LEDs). In embodiments, the light source may comprise an LED with on-chip optics. In embodiments, the light source comprises pixelated single LEDs (with or without optics) (offering in embodiments on-chip beam steering).

In embodiments, the light source may be configured to provide primary radiation, which is used as such, such as e.g. a blue light source, like a blue LED, or a green light source, such as a green LED, and a red light source, such as a red LED. Such LEDs, which may not comprise a luminescent material ("phosphor") may be indicated as direct color LEDs.

In other embodiments, however, the light source may be configured to provide primary radiation and part of the primary radiation is converted into secondary radiation. Secondary radiation may be based on conversion by a luminescent material. The secondary radiation may therefore also be indicated as luminescent material radiation. The luminescent material may in embodiments be comprised by the light source, such as an LED with a luminescent material layer or dome comprising luminescent material. Such LEDs may be indicated as phosphor converted LEDs or PC LEDs (phosphor converted LEDs). In other embodiments, the luminescent material may be configured at some distance ("remote") from the light source, such as an LED with a luminescent material layer not in physical contact with a die of the LED. Hence, in specific embodiments the light source may be a light source that during operation emits at least light at wavelength selected from the range of 380-470 nm. However, other wavelengths may also be possible. This light may partially be converted by the luminescent material.

In embodiments, the light generating device may comprise a luminescent material. In embodiments, the light generating device may comprise a PC LED. In other embodiments, the light generating device may comprise a direct LED (i.e. no phosphor). In embodiments, the light generating device may comprise a laser device, like a laser diode. In embodiments, the light generating device may comprise a superluminescent diode. Hence, in specific embodiments, the light source may be selected from the group of laser diodes and superluminescent diodes. In other embodiments, the light source may comprise an LED.

The light source may especially be configured to generate light source light having an optical axis (O), (a beam shape,) and a spectral power distribution. The light source light may in embodiments comprise one or more bands, having band widths as known for lasers.

The term "light source" may (thus) refer to a light generating element as such, like e.g. a solid state light source, or e.g. to a package of the light generating element, such as a solid state light source, and one or more of a luminescent material comprising element and (other) optics, like a lens, a collimator. A light converter element ("converter element" or "converter") may comprise a luminescent material comprising element. For instance, a solid state light source as such, like a blue LED, is a light source. A combination of a solid state light source (as light generating element) and a light converter element, such as a blue LED and a light converter element, optically coupled to the solid state light source, may also be a light source (but may also be indicated as light generating device). Hence, a white LED is a light source (but may e.g. also be indicated as (white) light generating device).

The term "light source" herein may also refer to a light source comprising a solid state light source, such as an LED or a laser diode or a superluminescent diode.

The term "light source" may (thus) in embodiments also refer to a light source that is (also) based on conversion of light, such as a light source in combination with a luminescent converter material. Hence, the term "light source" may also refer to a combination of an LED with a luminescent material configured to convert at least part of the LED radiation, or to a combination of a (diode) laser with a luminescent material configured to convert at least part of the (diode) laser radiation.

In embodiments, the term "light source" may also refer to a combination of a light source, like an LED, and an optical filter, which may change the spectral power distribution of the light generated by the light source. Especially, the term "light generating device" may be used to address a light source and further (optical components), like an optical filter and/or a beam shaping element, etc.

The phrases "different light sources" or "a plurality of different light sources", and similar phrases, may in embodiments refer to a plurality of solid-state light sources selected from at least two different bins. Likewise, the phrases "identical light sources" or "a plurality of same light sources", and similar phrases, may in embodiments refer to a plurality of solid-state light sources selected from the same bin.

The term "solid state light source", or "solid state material light source", and similar terms, may especially refer to semiconductor light sources, such as a light emitting diode (LED), a laser diode, or a superluminescent diode. Further, the light generating system may comprise a plurality of light generating devices configured to irradiate different parts of the lightguide, especially the side face (of the lightguide).

The terms "upstream" and "downstream" (mentioned above) relate to an arrangement of items or features relative to the propagation of the light from a light generating means (here especially the light sources), wherein relative to a first position within a beam of light from the light generating means, a second position in the beam of light closer to the light generating means is "upstream", and a third position within the beam of light further away from the light generating means is "downstream". It will be clear to the person skilled in the art that a reflector configured to reflect light from a space back into the space is thus both downstream and upstream of the space relative to the propagation of the light.

The light generating device may be configured to generate white device light. In other embodiments, the light generating device may be configured to generate colored light. In yet other embodiments, the spectral power distribution of the device light may be controllable. Hence, in embodiments the system may also comprise a control system configured to control the light generating device.

Especially, a plurality of sources of light and/or an extend source of light may be applied to irradiate the lightguide. Hence, in embodiments the light generating device may comprise a plurality of light sources, such as e.g. a LED strip. Alternatively or additionally, the light generating device may comprise an extended light source such as a (leaky) fiber or a LED filament. Yet, alternatively or additionally, a plurality of light generating devices may be applied. Hence, the term "light generating device" may also refer to a plurality of light generating devices. Especially, the light generating device may comprise a plurality of LEDs.

Especially, the light generating device may be configured to substantially homogenously irradiate the side face of the lightguide (see further also below).

As mentioned above, in embodiments, the light generating system may comprise the lightguide. The lightguide may especially be defined by one or more faces. In embodiments, the lightguide may comprise a first lightguide face, a second lightguide face, and a side face (for example a lightguide with a cylindrical cross-section). Further, in embodiments, the lightguide may (also) comprise one or more side faces (for example a lightguide with a hexagonal cross-section). Especially, the one or more side faces may bridge the first lightguide face and the second lightguide face. Note that in embodiments, the first lightguide face and/or the second lightguide face may be substantially planar. However, in other embodiments, the first lightguide face and/or the second lightguide face may be curved in one or two directions. Especially, however, the first lightguide face and the second lightguide face are substantially planar and substantially parallel. Herein, the first lightguide face and the second lightguide face may also be indicated as main faces or major faces.

Hence, in embodiments, the first lightguide face may be parallel to the second lightguide face (though this is not necessarily the case). In embodiments, the lightguide may have a cross-sectional shapes selected from e.g. a square, an oval, a rectangle, a circle and an ellipse. Especially, the lightguide may comprise a single side face, for example in embodiments with a circular or oval cross-sectional shape (parallel to the first lightguide face or second lightguide face). Alternatively, in embodiments, the lightguide may have a cross-sectional shape selected from an n sided polygon (or an n-gonal cross-section) i.e. the lightguide may comprise n side faces. Here, n-gonal refers to a polygonal shape with n sides such as a triangular shape, a tetragonal shape, a pentagonal shape, a hexagonal shape, etc. Especially, n may be at least 3, such as at least 4, such as at least 6. In some embodiments, the lightguide may have an equilateral n-gonal cross-sectional shape, wherein the one or more side faces comprised by the lightguide are equal in length (and the angle between two adjacent side faces are equal). However, in other embodiments, the length of the one or more side faces of the lightguide may not be equal. Furthermore, in embodiments, the angles between the one or more side faces may not be equal.

In embodiments, the lightguide may have a disc-like shape, such as a disc. Furthermore, in embodiments, the lightguide may have a three dimensional geometric shape selected from e.g. a tetrahedron, a truncated pyramid, etc.

Especially, the lightguide may facilitate the propagation of light. Hence, in embodiments, the lightguide may comprise a light transmissive material. Especially, the lightguide may be transmissive for device light. Especially, the lightguide may comprise one or more of PC, PMMA, and silicone (see further also below). The lightguide may especially comprise a dielectric material with high permittivity for light, and in general a high index of refraction. Especially, the lightguide may e.g. include silicone or fused silica, but also other materials may be applied. In embodiments, the lightguide may comprise a silicone material, such as silicone, (fused) silica, glass, quartz, etc. However, also another (solid) material or combination of (solid) materials may be applied.

Materials that may especially qualify as lightguide materials may be selected from the group consisting of glasses, thermoplastic polymers, silicones, etc. Especially, the lightguide material comprises a (thermoplastic) polymer selected from the group consisting of ABS (acrylonitrile butadiene styrene), Nylon (or polyamide), Acetate (or cellulose), PLA (poly lactic acid), terephthalate (such as PET polyethylene terephthalate), Acrylic (polymethylacrylate, Perspex, polymethylmethacrylate, PMMA), Polypropylene (or polypropene), Polycarbonate (PC), Polystyrene (PS), PE (such as expanded-high impact-Polythene (or polyethene), Low density (LDPE) High density (HDPE)), PVC (polyvinyl chloride) Polychloroethene, such as thermoplastic elastomer based on copolyester elastomers, polyurethane elastomers, polyamide elastomers polyolefine based elastomers, styrene based elastomers, etc. Optionally, the lightguide material may comprise a lightguide material selected from the group consisting of Urea formaldehyde, Polyester resin, Epoxy resin, Melamine formaldehyde, thermoplastic elastomer, etc. Optionally, the lightguide material may comprise a lightguide material selected from the group consisting of a polysulfone. Elastomers, especially thermoplastic elastomers, may especially be interesting as they are flexible and may help obtaining relatively more flexible filaments comprising the thermally conductive material. A thermoplastic elastomer may comprise one or more of styrenic block copolymers (TPS (TPE-s)), thermoplastic polyolefin elastomers (TPO (TPE-o)), thermoplastic vulcanizates (TPV (TPE-v or TPV)), thermoplastic polyurethanes (TPU (TPU)), thermoplastic copolyesters (TPC (TPE-E)), and thermoplastic polyamides (TPA (TPE-A)).

Suitable thermoplastic materials, such as also mentioned in WO2017/040893, may include one or more of polyacetals (e.g., polyoxyethylene and polyoxymethylene), poly($C_{1-6}$ alkyl) acrylates, polyacrylamides, polyamides, (e.g., aliphatic polyamides, polyphthalamides, and polyaramides), polyamideimides, polyanhydrides, polyarylates, polyarylene ethers (e.g., polyphenylene ethers), polyarylene sulfides (e.g., polyphenylene sulfides), polyarylsulfones (e.g., polyphenylene sulfones), polybenzothiazoles, polybenzoxazoles, polycarbonates (including polycarbonate copolymers such as polycarbonate-siloxanes, polycarbonate-esters, and polycarbonate-ester-siloxanes), polyesters (e.g., polycarbonates, polyethylene terephthalates, polyethylene naphtholates, polybutylene terephthalates, polyarylates), and polyester copolymers such as polyester-ethers), polyetheretherketones, polyetherimides (including copolymers such as polyetherimide-siloxane copolymers), polyetherketoneketones, polyetherketones, polyethersulfones, polyimides (including copolymers such as polyimide-siloxane copolymers), poly($C_{1-6}$ alkyl) methacrylates, polymethacrylamides, polynorbornenes (including copolymers containing norbornenyl units), polyolefins (e.g., polyethylenes, polypropylenes, polytetrafluoroethylenes, and their copolymers, for example ethylene-alpha-olefin copolymers), polyoxadiazoles, polyoxymethylenes, polyphthalides, polysilazanes, polysiloxanes, polystyrenes (including copolymers such as acrylonitrile-butadiene-styrene (ABS) and methyl methacrylate-butadiene-styrene (MBS)), polysulfides, polysulfonamides, polysulfonates, polysulfones, polythioesters, polytriazines, polyureas, polyurethanes, polyvinyl alcohols, polyvinyl esters, polyvinyl ethers, polyvinyl halides, polyvinyl ketones, polyvinyl thioethers, polyvinylidene fluorides, or the like, or a combination comprising at least one of the foregoing thermoplastic polymers. Embodiments of polyamides may include, but are not limited to, synthetic linear polyamides, e.g., Nylon-6,6; Nylon-6,9; Nylon-6,10; Nylon-6,12; Nylon-11; Nylon-12 and Nylon-4,6, preferably Nylon 6 and Nylon 6,6, or a combination comprising at least one of the foregoing. Polyurethanes that can be used include aliphatic, cycloaliphatic, aromatic, and polycyclic polyurethanes, including those described above. Also useful are poly($C_{1-6}$ alkyl) acrylates and poly($C_{1-6}$ alkyl) methacrylates, which include, for instance, polymers of methyl acrylate, ethyl acrylate, acrylamide, methacrylic acid, methyl methacrylate, n-butyl acrylate, and ethyl acrylate, etc. In embodiments, a polyolefine may include one or more of polyethylene, polypropylene, polybutylene, polymethylpentene (and co-polymers thereof), polynorbornene (and co-polymers thereof), poly 1-butene, poly(3-methylbutene), poly(4-methylpentene) and copolymers of ethylene with propylene, 1-butene, 1-hexene, 1-octene, 1-decene, 4-methyl-1-pentene and 1-octadecene.

In specific embodiments, the lightguide material may comprise one or more of polycarbonate (PC), polyethylene (PE), high-density polyethylene (HDPE), polypropylene (PP), polyoxymethylene (POM), polyethylene naphthalate (PEN), styrene-acrylonitrile resin (SAN), polysulfone (PSU), polyphenylene sulfide (PPS), and semi-crystalline polytethylene terephthalate (PET), acrylonitrile butadiene styrene (ABS), poly(methyl methacrylate) (PMMA), polystyrene (PS), and styrene acrylic copolymers (SMMA).

Especially, the lightguide material is selected such that the material as such is relatively highly transmissive for light, especially visible light.

Especially, the material has a light transmission in the range of 50-100%, especially in the range of 70-100%, for light having a wavelength selected from the visible wavelength range. Herein, the term "visible light" especially relates to light having a wavelength selected from the range of 380-780 nm. The transmission (or light permeability) can be determined by providing light at a specific wavelength with a first intensity to the light transmissive material under perpendicular radiation and relating the intensity of the light at that wavelength measured after transmission through the material, to the first intensity of the light provided at that specific wavelength to the material (see also E-208 and E-406 of the CRC Handbook of Chemistry and Physics, 69th edition, 1088-1989).

In specific embodiments, a material may be considered transmissive when the transmission of the radiation at a wavelength or in a wavelength range, especially at a wavelength or in a wavelength range of radiation generated by a source of radiation as herein described, through a 1 mm thick layer of the material, especially even through a 5 mm thick layer of the material, under perpendicular irradiation with said radiation is at least about 20%, such as at least 40%, like at least 60%, such as especially at least 80%, such as at least about 85%, such as even at least about 90%.

The light transmissive material has light guiding or wave guiding properties. Hence, the light transmissive material is herein also indicated as waveguide material or lightguide material. Note that the lightguide may also be referred to as a waveguide. The light transmissive material will in general have (some) transmission of one or more of (N) UV, visible and (N) IR radiation, such as in embodiments at least visible light, in a direction perpendicular to the length of the light transmissive material. Without the activator (dopant) such as trivalent cerium, the internal transmission in the visible might be close to 100%.

The transmission of the light transmissive material (as such) for one or more luminescence wavelengths may be at least 80%/cm, such as at least 90%/cm, even more especially at least 95%/cm, such as at least 98%/cm, such as at least 99%/cm. This implies that e.g. a 1 $cm^3$ cubic shaped piece of light transmissive material, under perpendicular irradiation of radiation having a selected luminescence wavelength (such as a wavelength corresponding to an emission maximum of the luminescence of the luminescent material of the light transmissive material), will have a transmission of at least 95%.

Herein, values for transmission especially refer to transmission without taking into account Fresnel losses at interfaces (with e.g. air). Hence, the term “transmission” especially refers to the internal transmission. The internal transmission may e.g. be determined by measuring the transmission of two or more bodies having a different width over which the transmission is measured. Then, based on such measurements the contribution of Fresnel reflection losses and (consequently) the internal transmission can be determined. Hence, especially, the values for transmission indicated herein, disregard Fresnel losses.

Note that the transmission of the lightguide material as such may be relatively high, but that the transmission of the lightguide may be lower due to e.g. scattering at light outcoupling structures, would such be available in the lightguide material (see also below).

In embodiments, the lightguide may comprise light outcoupling elements (or light outcoupling structures). The light outcoupling elements may in embodiments comprise reflective elements or light scattering elements, i.e., the light outcoupling elements may reflect or scatter (device) light incident upon them in a desired direction. The light outcoupling elements may especially be (three dimensional) particles, which may be embedded in the lightguide and/or at a lightguide face(s).

In embodiments, the light outcoupling elements may be configured within the lightguide. Here, the light outcoupling elements may comprise particles (to reflect or scatter (device) light) embedded within the lightguide. Hence, in this way, the light outcoupling elements may especially be distributed within the volume of the lightguide. Such light outcoupling elements may comprise solid particles or voids (e.g. gas pockets within the lightguide body). Alternatively or additionally, the light outcoupling elements, such as reflective dots, may in embodiments be embedded on the first lightguide face and/or the second lightguide face. Alternatively or additionally, the light outcoupling elements may, in embodiments, be arranged in the first lightguide face and/or in the second lightguide face, such as indentations, like (elongated) indentations.

Hence, in embodiments, the lightguide may comprise light outcoupling elements. The light outcoupling elements may be configured to facilitate light outcoupling from the lightguide in direction of the first lightguide face, especially of (incoupled) device light. Hence, the light outcoupling elements may be distributed on and/or in the lightguide. Practically, it may be convenient for the light outcoupling elements to be arranged on the first lightguide face and/or on the second lightguide face, especially (at least) on the second lightguide face.

The light outcouple elements may comprise particles embedded in the light transmissive material of the waveguide. Such particles may be scattering particles (like e.g. comprising one or more of $Al_2O_3$, $BaSO_4$ and $TiO_2$). The light outcouple elements may comprise elements at one or more faces of the waveguide, like indentations, scratches, grooves, dots of material, light scattering structures (in optical contact with one of the faces), etc, etc. Light outcouple elements are for instance described in WO9922268, WO2012059866, WO2018041470, and WO03027569, which are herein incorporated by reference. The light outcouple elements may be configured as regular pattern of light outcouple elements.

In embodiments, the light outcoupling elements may especially comprise reflective dots and/or scattering features. They may especially be applied via printing or dispensing or laser modification. The light outcoupling elements may especially be arranged on the second lightguide face such that a substantial part of the incoupled light is outcoupled from the lightguide via the first lightguide face. The physical dimensions and properties of such light outcoupling elements are discussed further below.

As mentioned above, in embodiments, the first lightguide face may comprise a surface area A1. Especially, the first lightguide face may further comprise an inner surface part and an outer surface part. Hence, the surface area A1 may in embodiments be defined by the inner surface area part and the outer surface area part. In embodiments, the outer surface part may at least partially surround the inner surface part. In further embodiments, the outer surface part may completely surround the inner surface part. Especially, the inner surface part may have an inner surface area A11 (or Ai) and the outer surface part may have an outer surface area A12 (or Ao). Hence, in embodiments $A1=A11+A12$. The ratio of the surface area of the inner surface part to the outer surface part may be selected, and may e.g. also depend upon the dimensions of the lightguide.

Analogously, in embodiments, the second lightguide face may comprise a surface area B1. Especially, the second lightguide face may comprise a second inner surface part and a second outer surface part, wherein the second outer surface part may at least partially surround the second inner surface part. In embodiments, the second inner surface part may have a second inner surface area B11 (or Bi) and the second outer surface part may have an outer surface area B12 (or Bo). Especially, $B1=B11+B12$.

In embodiments, the outer surface area may be at maximum 10%, such as at maximum 20%, especially at maximum 30%, more especially at maximum 40% of the surface area A1. Analogously, in embodiments, the inner surface area may be at maximum 90%, such as 80%, especially 70%, more especially 60% of the total surface area A1.

Further, in embodiments, the second outer surface area may be at maximum 10%, such as at maximum 20%, especially at maximum 30%, more especially at maximum 40% of the surface area B1. Analogously, in embodiments, the second inner surface area may be at maximum 90%, such as 80%, especially 70%, more especially 60% of the total surface area B1.

Further, in embodiments, the outer surface area A12 may be selected in the range 5-30%, such as 10-25%, especially 15-20%. Especially, selected from the range of 60-90%, such as 65-85%, especially 70-80% of the outcoupled device light may be outcoupled via the outer surface part. Analogously, in embodiments, the inner surface area A11 may be selected in the range 70-95%, such as 75-90%, especially 80-85%. Especially, selected from the range of 10-40%, such as 15-35%, especially 20-30% of the outcoupled device light may be outcoupled via the outer surface part.

Especially, the surface density of the light outcoupling elements comprised by the lightguide may be different in the inner surface part and the outer surface part and hence, the amount of light outcoupled from the outer surface part may especially be larger than the light outcoupled from the inner surface part.

In embodiments, the lightguide may comprise an inner lightguide part and an outer lightguide part. Especially, the outer lightguide part may surround the inner lightguide part. Further, in embodiments, the outer lightguide part may comprise the outer surface part and the inner lightguide part may comprise the inner surface part.

Further, in embodiments, the volume density of the light outcoupling elements comprised by the lightguide may be different in the inner lightguide part and the outer lightguide part and hence, the amount of light outcoupled from the outer lightguide part may especially be larger than the light outcoupled from the inner lightguide part.

Hence, in this way, the amount of light outcoupled from the periphery of the lightguide may especially be increased by increasing the surface or volume density of light outcoupling elements in the outer surface part (or outer lightguide part) as compared to the inner surface part (or inner lightguide part).

The term "density" in the phrase "density of the light outcoupling elements" may herein refer to a proportion of an area (or volume) covered by (or taken up by) the light outcoupling elements. Hence, a higher density of the light outcoupling elements with increasing normal distance to the first side face may be realized via an increase size of the light outcoupling elements and/or by an increased number of the light outcoupling elements.

Note that the configuration of the aforementioned light outcoupling elements may in embodiments differ within the lightguide such that a relatively larger amount of the (device) light is outcoupled via the outer surface part than the light outcoupled from the inner surface part. In other words, a ratio of a first ratio of the radiant fluxes ($\Phi o$, $\Phi i$) escaping from the respective outer surface are and inner surface area and a second ratio of the respective outer surface are and inner surface area may be larger than 1 (i.e. ($\Phi o/\Phi i/A12/A11>1$).

Hence, in specific embodiments, the outer surface area A12 is selected from the range of 5-30% of the surface area A1, and selected from the range of 60-90% of the outcoupled device light is coupled out via the outer surface part.

Further, in specific embodiments, the inner surface area A11 is selected from the range of 70-95% of the surface area A1, and selected from the range of 10-40% of the outcoupled device light is coupled out via the inner surface part.

As mentioned above, in embodiments, device light may be coupled into the lightguide, especially via the side face. Hence, the side face may be configured in a light-receiving relationship with the light generating device. The terms "light-receiving relationship" or "light receiving relationship", and similar terms, may indicate that an item may during operation of a source of light (like a light generating device or light generating element or light generating system) may receive light from that source of light. Hence, the item may be configured downstream of that source of light. Between the source of light and the item, optics may be configured. The terms "radiationally coupled" or "optically coupled" or "radiatively coupled" may especially mean that (i) a light generating element, such as a light source, and (ii) another item or material, are associated with each other so that at least part of the radiation emitted by the light generating element is received by the item or material. In other words, the item or material is configured in a light-receiving relationship with the light generating element. At least part of the radiation of the light generating element will be received by the item or material. This may in embodiments be directly, such as the item or material in physical contact with the (light emitting surface of the) light generating element. This may in embodiments be via a medium, like air, a gas, or a liquid or solid light guiding material. In embodiments, also one or more optics, like a lens, a reflector, an optical filter, may be configured in the optical path between light generating element and item or material. The term "in a light-receiving relationship" does, as indicated above, not exclude the presence of intermediate optical elements, such as lenses, collimators, reflectors, dichroic mirrors, etc. In embodiments, the term "light-receiving relationship" and "downstream" may essentially be synonyms.

Hence, in embodiments, the light generating device may be arranged in the vicinity of the side face of the lightguide. As mentioned above, the light generating system may comprise a plurality of light generating devices. Therefore, in further embodiments, the one or more light generating devices may be arranged in the vicinity of the side face of the lightguide. Especially, the light generating devices may be arranged around the lightguide such that device light (generated by the light generating devices) may enter the lightguide via the side face. In some embodiments, the lightguide may comprise one or more side faces, wherein each side face may be illuminated by one or more light generating devices. Further, in embodiments, the light generating devices may be arranged in an array, such as an array aligned with the side face of the lightguide. In particular, in embodiments, the light generating devices may be configured to provide the device light to the side face, i.e., the side face may be configured in a light-receiving relationship with the light generating devices. The light generating devices may be configured to provide the light source light to the side face, wherein at least 70%, such as at least 80%, more especially at least 85% of an area of the side face receives the device light. In specific embodiments, the light generating devices, more especially their light emitting surfaces, may not be in physical contact with the side face of the lightguide. However, in embodiments they may be relatively close to the side face of the lightguide, such as within a couple of cm's, or even within a couple of mm's, such as within a distance of 0.5 μm-5 cm, such as within a distance selected from 20 μm-2 cm. Alternatively or additionally, in embodiments, the one or more light generating devices may be configured relatively further away (including an upper part of the afore-mentioned ranges) from the side face of the lightguide. Especially, in such embodiments the light generating system may comprise one or more (additional) directional optical elements that facilitate guiding device light from the light generating device(s) to the side face of the lightguide. In embodiments, the directional optical elements may be selected from the group of a reflector, a lens, a collimator, etc.

In embodiments, at least part of the device light coupled into the lightguide may especially by guided by means of total internal reflection (within the lightguide), i.e., the lightguide may be configured to guide the incoupled device light. Here, at least a part of the device light may especially undergo one or more reflections, especially a plurality of reflections, within the lightguide. Hence, in embodiments, the light generating device may be configured to promote total internal reflection of device light within the lightguide. At least a part of the reflected device light may in embodiments be outcoupled from the lightguide via the first lightguide face to provide outcoupled device light. In summary, the light generating device and the lightguide may in embodiments be configured such that device light enters the lightguide via the side face to provide incoupled device light, at least part of incoupled device light may be guided via total internal reflection, and at least part of the incoupled device light is coupled out from the lightguide via the first lightguide face to provide outcoupled device light.

Note that, limiting the outcoupling of incoupled device light within the lightguide via the side face or the second lightguide face may provide the advantage that more device light may be outcoupled via the first lightguide face. Hence, in embodiments, the side face may be covered with half-silvered mirrors (or "one-way mirrors"). In such an embodiment, the incoupled device light may be reflected back into the lightguide at the side face. Analogously, in embodiments, the side face may be coated with reflective material or (a mirror), especially, the coating (or mirror) may have cutouts via which light may be incoupled and the remainder of the side face covered in the coating (or mirror) may provide the benefit of reflecting incoupled device light back into the lightguide. Hence, in this way, more device light may be outcoupled via the first lightguide face. As mentioned before, the light outcoupling elements may be configured to promote the outcoupling of device light via the first lightguide face. Especially, the light outcoupling elements may be configured such that more than 40%, such as more than 50%, especially more than 60% of the outcoupled device light is coupled out via the outer surface part.

As mentioned above, in embodiments, the light generating system may comprise the reflector, especially a hollow reflector. Especially, the reflector may comprise a (open) first reflector side, a (open) second reflector side and a reflector wall. The reflector wall may especially be tapering from the first reflector side to the second reflector side. The reflector may in embodiments comprise an optical axis ($O_R$). In embodiments, the reflector wall may be curved in one or two directions. Especially, the curved reflector wall may be reflective for light, especially device light.

In embodiments, the reflector may also be a light collimating body (or collimator). Especially the collimator may comprise a first reflector side via which device light may be incoupled, a second reflector side via which device light may be outcoupled, and a reflector side face wherein device light may be reflected by means of total internal reflection. Such collimating body may consist of a light transparent material.

As indicated above, the first reflector side may be configured further away from the first lightguide face than the second reflector side (is). Hence, the second reflector side is closer to the first lightguide face than the first reflector side. Especially, the outcoupled device light may enter the light collimating reflector at the second reflector side, and leave (collimate) from the first reflector side. In embodiments, the first lightguide face may essentially be adjacent to the second reflector side. In embodiments, the lightguide element may be configured partly in an open second reflector side. In other embodiments, the lightguide element may be configured at an open second reflector side, such that a cross-sectional plane of the second reflector side and a cross-sectional plane of the first lightguide face may essentially coincide. In other embodiments, the lightguide element may be configured at an open second reflector side, such that a cross-sectional plane of the second reflector side and a cross-sectional plane of the first lightguide face may have a small distance, like up to 10% of a total height (H1) of the light collimating reflector. In other embodiments, the lightguide element may be configured at a closed second reflector side (e.g. in the case of a collimator body), such that a cross-sectional plane of the second reflector side and a cross-sectional plane of the first lightguide face may have a small distance, like up to 10% of a total height (H1) of the light collimating reflector. In yet other embodiments, the first lightguide face of the lightguide element may be configured in physical contact with a closed second reflector side (e.g. in the case of a collimator body).

In embodiments, the cross-sectional area of the second reflector side may especially be essentially equal to the surface area of the first lightguide face. Especially, the cross-sectional area of the second reflector side may especially differ from the surface area of the first lightguide face by at maximum 5%, such as at maximum 3%, especially at maximum 1%. This may provide the benefit that the majority of the outcoupled device light (from the first lightguide face) may be incoupled into the reflector. Further, the shape of the second reflector side may essentially be similar to the shape of the first lightguide face. This may (also) provide the benefit of increasing the amount of outcoupled device light incoupled into the reflector.

In embodiments, part of the outcoupled device light incident on the surface of the reflector wall may be focused at a focal point (F). The term "focus" may also be used to refer to the focal point. Note that the focal point (F) may in embodiments not be coincident with the optical axis ($O_R$). Further, the focal point (F) may not be a single point as the location of the focal point (F) may be located at different locations depending on the position and curvature of the reflector wall. In embodiments, the focal points of the entire reflector wall may form a closed curve or locus. Note that, in embodiments, the locus of foci (F) may enclose a shape similar (especially identical) to the cross-section of the entire reflector wall in a cross-sectional plane perpendicular to the optical axis ($O_R$). For instance, in embodiments, the reflector wall may be configured around the optical axis ($O_R$) and the locus of the foci (F) may form a continuous line surrounding the optical axis ($O_R$). Especially, the locus may in embodiments lie in a plane parallel to a plane through the first lightguide face.

Further, in embodiments, a projection (in a direction along the optical axis ($O_R$)) of the locus of foci (F) on a plane through the first lightguide face lies closer to the outer surface part than to the optical axis ($O_R$). Especially, the shortest distance between the projection of the locus of foci (F) (on a plane through the first lightguide face) and the outer surface part may be smaller than the shortest distance between the locus of foci (F) and the optical axis ($O_R$). In some embodiments, the first lightguide face may not be flat. In such an embodiments, the projection of the locus on the first lightguide face may (still) lie closer to the outer surface part than to the optical axis ($O_R$). Furthermore, in embodiments, the projection of the locus of foci (F) (on the first lightguide face) may lie on the outer surface part. Yet further, in embodiments, the projection of the locus of foci (F) (on the first lightguide face) may surround the outer surface part. In embodiments, the focus F may be coincident with an axis (Op) perpendicular to the outer surface part and penetrating the outer surface part. Note that the axis (Op) may especially not be coincident with the optical axis ($O_R$). Especially, however, the first lightguide face and the second lightguide face may essentially be parallel.

Note that the reflector wall may in embodiments have a curvature in at least one direction. Especially, the reflector wall may be curved in a cross-sectional plane through (and parallel to) the optical axis ($O_R$). Additionally, the reflector wall may be curved in a cross-sectional plane perpendicular to the optical axis ($O_R$). The curvature may essentially be continuous, but may in other embodiments be facetted.

In a cross-sectional plane through (and parallel to) the optical axis ($O_R$) the reflector wall may have a semi-parabola-like shape. Especially, in said plane, a part of the reflector wall (in the cross-section) may have a first curvature. In embodiments, the profile of the reflector wall in this cross-sectional plane may be a part of a parabolic curve. Note that this part may not be a complete parabola but only a portion of the parabolic curve. Typically, a parabolic reflector with a parabolic cross-section may have a focus. Especially, even a part of such a parabolic reflector may (also) have the same focal point. Since, in the cross-sectional plane, the reflector wall has a part of the parabolic profile (or parabolic reflector), the reflector wall in the cross-section may have a semi-parabola-like shape. Especially, the semi-parabola-like shape may be defined such that focus F of this part of the reflector wall is located at a point where the focus F would have been located considering a complete parabolic reflector. Hence, in this way, such a profile of the reflector wall may especially be semi-parabola-like. Here, reference is only made to the profile of the reflector wall in the said cross-sectional plane. The reflector wall may in embodiments be provided by a rotation of the semi-parabola-like shape about the optical axis ($O_R$). Note that, in embodiments, the reflector wall may be located further away from the optical axis ($O_R$) such that the focus (F) of this part of the reflector wall is located away from the optical axis ($O_R$).

In a different cross-sectional plane, i.e., in a cross-sectional plane perpendicular to the optical axis ($O_R$) (and especially parallel to the first lightguide face), the reflector wall may be curved in a second direction i.e., the reflector wall may have a second curvature. The reflector may in embodiments have a shape selected from an oval, an ellipse, a circle, etc. In some embodiments, the reflector wall may have a polygonal cross-section (and may thus be facetted). Especially, the reflector wall may comprise one or more sides, wherein the edge between the sides of the reflector wall may be curved or beveled. For instance, in a cross-sectional plane perpendicular to the optical axis ($O_R$), the reflector wall may especially have a square shape wherein, the square reflector may have rounded (or beveled) corners. Especially, the reflector wall may be curved around the optical axis ($O_R$).

The curvature of the reflector wall (in a plane perpendicular to the optical axis ($O_R$)) may be different at different locations along the reflector wall, and hence, the location of the focus (F) may (also) be different at different locations on the reflector wall. As mentioned before, in embodiments, the reflector wall may be curved such that the foci (F) lie on a single continuous line. Hence, in embodiments, the reflector wall may be curved in one or more directions such that the focus (F) at any location along the reflector wall is coincident with the locus. Hence, in specific embodiments, a cross-section of the reflector wall with a plane parallel to the optical axis ($O_R$) provides a semi-parabola-like shape, wherein a rotation of the semi-parabola-like shape about an axis (Op) perpendicular to the outer surface part and penetrating through the outer surface part provides a parabola-like shape having a focus (F) coincident with the locus. In specific embodiments, the light collimating reflector may be rotational symmetric about the optical axis ($O_R$).

As mentioned above, in embodiments, the reflector may comprise the first reflector side and the second reflector side. In embodiments, the second reflector side may especially be configured closer to the first lightguide face than the first reflector side. Especially, device light may enter the reflector via the second reflector side, undergo a reflection at the reflector wall, and be outcoupled from the reflector via the first reflector side. Hence, the reflector may in embodiments be configured to beam shape the outcoupled device light emanating from the first lightguide face. Hence, the reflector may also be referred to as the light collimating reflector.

In embodiments, the first reflector side may have a first circular equivalent diameter Dc1. Further, in embodiments, the second reflector side may have a second circular equivalent diameter Dc2. The equivalent circular diameter (or ECD) (or "circular equivalent diameter") of an (irregularly shaped) two-dimensional shape is the diameter of a circle of equivalent area. For instance, the equivalent circular diameter of a square with side a is 2*a*SQRT (1/T). For a circle, the diameter is the same as the equivalent circular diameter. Would a circle in an xy-plane with a diameter D be distorted to any other shape (in the xy-plane), without changing the area size, than the equivalent circular diameter of that shape would be D.

As mentioned before, in embodiments, the first reflector side and/or the second reflector side may or may not be circular. Here, the circular equivalent diameter Dc1 and Dc2 are the diameters of a circle with the same surface area as the first reflector side and the second reflector side, respectively. Especially, the first reflector side may be larger than the second reflector side such that $0.1 \leq Dc2/Dc1 \leq 0.95$, such as $0.3 \leq Dc2/Dc1 \leq 0.95$, especially $0.5 \leq Dc2/Dc1 \leq 0.95$, more especially $0.7 \leq Dc2/Dc1 \leq 0.95$. Furthermore, in embodiments, $0.6 \leq Dc2/Dc1 \leq 0.65$, such as $0.6 \leq Dc2/Dc1 \leq 0.75$, especially $0.6 \leq Dc2/Dc1 \leq 0.85$. Yet further, in embodiments, $0.3 \leq Dc2/Dc1 \leq 0.6$, such as $0.5 \leq Dc2/Dc1 \leq 0.6$. In specific embodiments, the first reflector side has a first circular equivalent diameter Dc1, where the second reflector side has a second circular equivalent diameter Dc2, wherein $0.5 \leq Dc2/Dc1 \leq 0.95$, more especially $0.6 \leq Dc2/Dc1 \leq 0.95$. Further, as indicated above, the light collimating reflector may comprise a hollow reflector or a light transmissive body.

In embodiments, the reflector may have a height H1 measured in a direction along the optical axis ($O_R$) and defined between the first reflector side and the second reflector side. Especially, the height H1 of the reflector may be defined in relation to the first circular equivalent diameter such that $0.05 \leq H1/Dc1 \leq 0.33$, such as $0.15 \leq H1/Dc1 \leq 0.33$, especially $0.25 \le H1/Dc1 \le 0.33$. Further, in embodiments, $0.1 < H1/Dc1 \le 0.85$, such as $0.1 < H1/Dc1 \le 0.65$, especially $0.1 < H1/Dc1 \le 0.45$. Especially, in embodiments, $0.05 \le H1/Dc1 \le 0.85$, such as especially $0.1 \le H1/Dc1 \le 0.33$.

As mentioned above, the configuration (or arrangement) of light outcoupling elements (comprised by the one or more of lightguide faces and/or arranged in the lightguide) may in embodiments facilitate providing a larger amount of (device) light from the outer surface part as compared to the inner surface part.

In embodiments, the lightguide may comprise a central point (C) and an outer edge (OE), wherein the central point (C) may be located at the geometric center of the lightguide and the outer edge (OE) is the edge that defines the boundary of the first lightguide face (and the side face). Alternatively, in embodiments, the central point (C) may also be located at a position different from the geometric center of the lightguide. In such an embodiment, the central point (C) may refer to a point around which the light outcoupling elements may be configured. In embodiments, the density of the light outcoupling elements may increase with increasing radial distance from the central point (C). Especially, however, the central point (C) may be located at the geometric center of the lightguide and the outer edge (OE). Further, especially the optical axis may go through the central point (C).

In embodiments, the light outcoupling elements may be configured in physical contact with the first lightguide face and/or the second lightguide face. In such embodiments, the light outcoupling elements may cover a portion of the area of the first lightguide surface and/or the second lightguide surface. Hence, density may be defined as a percentage of the surface area covered by the light outcoupling element. Note that density may be defined locally wherein the (local) density may be defined at a part (or local region) of the surface of the first lightguide face (and/or the second lightguide face) covered by light outcoupling elements.

In embodiments, the light outcoupling elements may (also) be arranged within the lightguide. In such embodiments, the light outcoupling elements may cover a portion of the volume of the lightguide. Hence, density may (also) be defined as a percentage of the volume of the lightguide occupied by the light outcoupling elements. Note that density may be defined locally wherein the (local) density may be defined at a part (or local region) of the volume of the lightguide occupied by the light outcoupling elements.

As mentioned above, in embodiments, the density of the light outcoupling elements may increase with increasing radial distance from the central point (C), for example a region (defined on the first lightguide face) further away from the central point (C) may have a higher density of light outcoupling elements than another region (defined on the first lightguide face) closer to the central point (C). Additionally or alternatively, the density of the light outcoupling elements at a volume (defined within the lightguide) further from the central point (C) may have a higher density then another volume (defined within the lightguide) closer to the central point (C). Especially, the density of the light outcoupling elements may be higher in the outer surface part as compared to the inner surface part. Furthermore, in embodiments, the density of the light outcoupling elements may be higher in the outer lightguide part as compared to the inner lightguide part. Hence, more (device) light may be outcoupled from the outer surface part than from the inner surface part. In this way, the higher density of the light outcoupling elements arranged further away from the central point may result in more amount of (device) light outcoupled from the first lightguide face, especially from the outer surface part.

Would the distribution of the light outcoupling elements not be as described herein (for example a uniform distribution of light outcoupling elements on the first lightguide face or within the lightguide), more light would be outcoupled from the inner surface part closer to the optical axis ($O_R$) as compared to the outer surface part. In such a configuration, the majority of the light may not pass through the locus of foci (F), thereby providing an unfocussed wide beam, which may not be desirable.

However, embodiments with a distribution of light outcoupling elements as described herein may especially outcouple more device light from the outer surface part as compared to the inner surface part. In such embodiments, the majority of the light may pass through the locus of foci (F), thus providing a focused and narrow beam of light. Additionally or alternatively, in embodiments, there may be a first modulation of the distribution of light outcoupling elements. In embodiments, the density of the light outcoupling elements may increase from the central point (C) to a point defined in the outer surface part (or closer to the outer surface part). Moving further towards the edge (OE) beyond said point, there may again be a decrease in density of the light outcoupling elements. Note that, in embodiments, despite the decrease in the density of light outcoupling elements in a part of the outer surface part (i.e., local density), the density of the light outcoupling elements in the (entire) outer surface part may still be higher that the density of light outcoupling elements in the (entire) inner surface part. The density of the light outcoupling elements may especially be high in the vicinity of the locus of foci F. Thus, increasing the amount of outcoupled device light outcoupled from the part of the outer surface part closest to the locus of foci F.

Especially, in embodiments, the (average) density of light outcoupling elements in the outer surface part may be higher than the (average) density of light outcoupling elements in the inner surface part. However, in embodiments in both the inner surface part and the outer surface part, the density of the light outcoupling elements may increase with decreasing distance from the outer edge (OE). Especially, in the outer surface part, the peak (local) density of light outcoupling elements may be located at a point closest to the locus of foci F, hence, increasing the amount of outcoupled device light outcoupled from the outer surface part. This may provide the benefit of outcoupling device light from the first lightguide face with a homogenous flux distribution.

However, in addition to the light outcoupled from the outer surface part, the light outcoupled from the inner surface part may (also) be increased. In the inner surface part, the highest density of light outcoupling elements may in embodiments be located at the central point (C) which may increase the light outcoupled from the inner surface part or which may make the outcoupling of the device light from the inner surface part more even. Note that a disproportionate increase in the amount of light outcoupled from the outer surface part as compared to the inner surface part may especially lead to a dimming of the outcoupled light from the center of the light generating system, which may result in outcoupling of device light with an inhomogeneous distribution of light (i.e. lower light intensity at the center). This may be mitigated by configuring the light outcoupling elements in the inner surface part and outer surface part as described herein.

A decrease or increase in density of light outcoupling elements may be gradual or stepwise.

Further, the beam shape of the outcoupled device light from the first lightguide face is dependent on the combination of light outcoupled from the inner surface part and the outer surface part. Especially, a larger amount of light may be outocupled from the inner surface part (in the absence of any light outcoupling devices), because light reflected at the second inner surface part (of the second lightguide face) is likely to be outcoupled without a subsequent reflection at the side face, which may result in outcoupling of device light with an inhomogeneous distribution of light (i.e. lower light intensity at the periphery).

As mentioned above, the distribution of the intensity of the outcoupled device light from the light generating system may be dependent on the amount of light outcoupled from the inner surface part and the outer surface part, hence, by configuring the light outcoupling elements as described herein, light with a homogenous intensity may be outcoupled from the first lightguide face.

As indicated above, in embodiments the increase in density of the outcoupling elements may be gradual or stepwise. Here, gradual may refer to a smooth increase in the density of the light outcoupling elements with distance. Further, a stepwise increase may refer to a discrete increase in the density wherein the lightguide is discretized into bins (or regions on the first lightguide face defined between two fictional concentric circles), wherein the density of the light outcoupling elements remains relatively constant within a bin, however, a bin situated further away from the central point C may have a higher density than another bin located closer to the central point C. In such embodiments, the density may increase in steps between two bins. Hence, in this way, the increase in density may in embodiments be gradual or stepwise. Further, in embodiments, the increase in density may be a combination of gradual and stepwise.

In summary, in specific embodiments, the lightguide comprises a central point (C) and an outer edge (OE), wherein over a first portion from C to OE with increasing radial distance from the central point (C) a density of the light outcoupling elements increases, wherein the increase in density of the light outcoupling elements is gradual or stepwise.

The density of the light outcoupling elements in a region may especially be dependent on the size of the light outcoupling elements and/or the number of light outcoupling elements defined in said region. In embodiments, a region of the lightguide with a larger number of light outcoupling elements may have a larger density than another region (of equal area (or volume)) with equally sized but fewer light outcoupling elements. Alternatively, in embodiments, a region of the lightguide with larger sized light outcoupling elements may have a larger density than another region (of equal area (or volume)) with an equal number but smaller sized light outcoupling elements. However, in embodiments, the size and the number of light outcoupling elements in a region comprised by the lightguide may influence the relative density of the region. Such embodiments are discussed further below.

The phrase "light outcoupling elements in a region" may refer to light outcoupling elements at the first lightguide face, light outcoupling elements at the second lightguide face, or light outcoupling elements within the lightguide. Combinations of different locations of light outcoupling elements may also be possible, such as e.g. light outcoupling elements at the first lightguide face and light outcoupling elements at the second lightguide face.

Hence, in embodiments at least a part of a total number of the light outcoupling elements may be arranged within the lightguide. Especially, at least a part of the total number of the light outcoupling elements may be enclosed by the lightguide. Alternatively or additionally, at least a part of the total number of light outcoupling elements may be comprised by the first lightguide face. Here, in embodiments, at least a part of the total number of light outcoupling elements may be configured (or arranged) outside the lightguide and in contact with the first lightguide face. Alternatively or additionally, at least a part of the total number of light outcoupling elements may be configured (or arranged) within the lightguide and in contact with the first lightguide face. Furthermore, in embodiments, at least a part of the total number of light outcoupling elements may be configured such that the light outcoupling elements protrude from the first lightguide face.

Similarly, in embodiments, at least a part of the total number of light outcoupling elements may be comprised by the second lightguide face. Here, in embodiments, at least a part of the total number of light outcoupling elements may be configured (or arranged) outside the lightguide and in contact with the second lightguide face. Alternatively or additionally, at least a part of the total number of light outcoupling elements may be configured (or arranged) within the lightguide and in contact with the second lightguide face. Furthermore, in embodiments, at least a part of the total number of light outcoupling elements may be configured such that the light outcoupling elements protrude from the second lightguide face.

In summary, in specific embodiments, the density of the light outcoupling elements may vary via one or more of (i) a size of the light outcoupling elements and (ii) a number of the light outcoupling elements, wherein one or more of the following may apply: (a) at least part of a total number of the light outcoupling elements are arranged in the lightguide, (b) at least part of the total number of the light outcoupling elements are comprised by the first lightguide face, and (c) at least part of the total number of the light outcoupling elements are comprised by the second lightguide face.

As mentioned above, the density of the light outcoupling elements in a region may be dependent of both the number of light outcoupling elements and the size of the light outcoupling elements. Especially, the light outcoupling elements may be configured (i) on (or in) the surface of the first lightguide face and/or the second lightguide face, and/or (ii) within the lightguide. In the following section, first, the configuration of light outcoupling elements within the (bulk) of the lightguide in embodiments are described, and second, the configuration of light outcoupling elements on the surface of the first lightguide face and/or the second lightguide face in embodiments are described.

In embodiments, the density of the light outcoupling elements may be defined by the relation $N_v*D_{eq}/V$, wherein Ny refers to the number of the light outcoupling elements in the inner lightguide part or the outer lightguide part, $D_{eq}$ refers to the equivalent spherical diameters of the outcoupling elements related the inner lightguide part or the outer lightguide part, and V refers to the volumes of the inner lightguide part or the outer lightguide part. The equivalent spherical diameter (or ESD) of an (irregularly) shaped object is the diameter of a sphere of equivalent volume. Hence, the equivalent spherical diameter (ESD) of a cube with a side a is. Would a sphere in an xyz-coordinate system with a diameter D be distorted to any other shape (in the xyz-plane), without changing the volume, than the equivalent spherical diameter of that shape would be D.

Hence, in this way, the density of the light outcoupling elements in the respective lightguide parts may be higher in dependence of the number and/or the size of the light outcoupling structures. Furthermore, such a density measure may also be referred to as volume density.

In embodiments, the light outcoupling elements may comprise reflective particles. Especially, the inner lightguide part may comprise a first volume density d1v (of reflective particles) and the outer lightguide part may comprise a second volume density d2v (of reflective particles). Further, in embodiments, the second volume density may be higher than the first volume density. Especially, $d2v/d1v>1$, such as $d2v/d1v\geq1.2$, especially $d2v/d1v\geq1.5$, more especially $d2v/d1v\geq2$, more especially $d2v/d1v\geq3$. In specific embodiments, the lightguide may comprise (i) an inner lightguide part comprising the inner surface part, wherein the light outcoupling elements are arranged in the inner lightguide part with a first volume density d1v, and (ii) an outer lightguide part comprising the outer surface part, wherein the light outcoupling elements are arranged in the outer lightguide part with a second volume density d2v; and wherein $d2v/d1v\geq1.5$. Especially, in embodiments $1.1\leq d2v/d1v\leq10$, such as $1.2\leq d2v/d1v\leq8$.

In embodiments, the reflective particles may have different shapes and/or sizes. Especially, the reflective particles may have a spherical equivalent diameter selected from the range 2-200 μm, such as especially selected from the range of 3-30 μm, such as 5-25 μm, especially 10-20 μm. In specific embodiments, the light outcoupling elements may comprise reflective particles, wherein the reflective particles are arranged in the lightguide, and wherein the reflective particles have spherical equivalent diameters selected from the range of 3-30 μm. In embodiments, at least 50 wt % of the reflective particles may have a spherical equivalent diameter selected from the range of 2-200 μm, such as selected from the range of 3-30 μm. Note that instead of reflective particles, or in addition to reflective particles, voids may be applied (also with sizes as indicated for the reflective particles).

As mentioned above, the light outcoupling elements may in embodiments be arranged in contact with one or more of the first lightguide face, or the second lightguide face, or a combination of both). Note that in some embodiments, the first lightguide face and the second lightguide face may be parallel and have equal area. In such embodiments, the second lightguide face may comprise a second inner surface part and a second outer surface part, analogous to the inner surface part and the outer surface part comprised by the first lightguide face, respectively. Especially, the density of the light outcoupling elements arranged in contact with the first lightguide face and/or the second lightguide face may be different for the second inner surface part and a second outer surface part, would light outcoupling elements be configured there, and/or may be different for the inner surface part and the outer surface part would the light outcoupling elements be configured there.

In embodiments, the density of the light outcoupling elements may be defined by the relation $N_a*D_{eq}/A$, wherein $N_a$ refers to the number of the light outcoupling elements related to the inner lightguide part or the outer lightguide part, $D_{eq}$ refers to the equivalent circular diameters of the outcoupling elements related to the inner surface part or the outer surface part and defined parallel to the first lightguide face, and A refers to the area of the inner surface part or the outer surface part. Hence, in this way, the density of the light outcoupling elements in the respective surface part (i.e. the inner surface part and/or the outer surface part (comprised by the first lightguide face) and/or the density of the light outcoupling elements in the respective second surface part (comprised by the second lightguide face)) may be higher in dependence of the number and/or the size of the light outcoupling structures. Furthermore, such a density measure may also be referred to as surface density.

In embodiments, the light outcoupling elements related to the inner surface part may have a first surface density d1s and the light outcoupling elements related to the outer surface part may have a second surface density d2s. In embodiments $d2s/d1s>1$, such as $d2s/d1s\geq1.2$, especially $d2s/d1s\geq1.55$, more especially $d2s/d1s\geq2$. In specific embodiments, the light outcoupling elements may be arranged on one or more of the first lightguide face and the second lightguide face, wherein the light outcoupling elements related to the inner lightguide part have a first surface density d1s, wherein the light outcoupling elements related to the outer lightguide part have a second surface density d2s, and wherein $d2s/d1s\geq1.5$. Especially, in embodiments $1.1\leq d2s/d1s\leq10$, such as $1.2\leq d2s/d1s\leq8$.

In embodiments, the light outcoupling elements may comprise reflective structures. Especially, the reflective structures may comprise reflective dots. A reflective dot may in embodiments be a flat structure with one side mirrored. The reflective dot may in embodiments comprise a circular or polygonal cross-section. In embodiments, the reflective dots may be arranged on (or in) the second lightguide face. More especially, the reflective dots may (also) be arranged on (or in) the first lightguide face. In embodiments, the reflective dots arranged on (or in) the first lightguide face may reflect incoupled device light (incident on the first lightguide face) back into the lightguide. This may especially provide the benefit of controlling the amount of light outcoupled from the inner lightguide part and outer lightguide part i.e., reflective dots may reduce the amount of light outcoupled from a respective lightguide part.

The reflective structures may, in embodiments, have different shapes and/or sizes. Especially, the reflective structures may have a circular equivalent diameter selected from the range 0.1-5 mm, such as 0.2-2 mm, especially 0.5-1 mm. In specific embodiments, the light outcoupling elements comprise reflective structures comprised by one or more of the first lightguide face and the second lightguide face, wherein the reflective structures have a circular equivalent diameters selected from the range of 0.1-5 mm (wherein the reflective structures comprise dots).

Incoupled device light may be undergo a reflection and/or scattering within the lightguide and may escape from the side face, the first lightguide face and the second lightguide face. Hence, in embodiments, the light generating system may comprise an auxiliary reflector. Especially, the auxiliary reflector may be flat and may be reflective for outcoupled device light. In embodiments, the auxiliary reflector may be configured closer to the second lightguide face than the first lightguide face. In this way, the outcoupled device light (from the second lightguide face) may especially be reflected back into the lightguide. This may especially minimize the amount of device light (or outcoupled device light) escaping the lightguide via the second lightguide face. Therefore, in embodiments, the auxiliary reflector may increase amount of outcoupled device light outcoupled via the first lightguide face.

In embodiments, the light generating system may be configured to generate system light. Especially, system light may comprise the outcoupled device light. In embodiments, the light generating system may be configured to generate a beam of system light with at least one cross-section perpendicular to the optical axis ($O_R$) with a full width at half maximum of at maximum 50°. Especially, the configuration may generate a beam of system light having a full width at half maximum of at maximum 40°, in different embodiments: at least 30°, such as at least 20°, especially at least 10°. Further, in embodiments, the beam has a full width half maximum selected from the range of 5-60°, such as especially selected from the range of 10-50°, such as 15-45°, like 25-35°. Especially, the reflector may facilitate beam shaping the system light. The optional full width half maximum conditions as indicated above may apply for one cross-section of the beam or for two orthogonal cross-sections. In specific embodiments, the light generating system is configured to generate system light, wherein the system light comprises the outcoupled device light, wherein the light generating system is configured to provide a beam of the system light, wherein the beam has a full width half maximum selected from the range of 2-50°, such as 10-50°.

In specific embodiments, the beam of light obtained with the arrangement of the light generating device, lightguide, and reflector, may comprise two contributions. A first contribution may have a relatively narrow bandwidth, in the sense that a first full width half maximum $\alpha 1$ may be at maximum about 20°, such as at maximum about 10°. A second contribution may have a less narrow bandwidth, in the sense that a second full width half maximum $\alpha 2$ may be at maximum about 60°, such as at maximum about 50°. Especially, $\alpha 1<\alpha 2$. For instance, $\alpha 2-\alpha 1\geq 5°$, like in embodiments $\alpha 2-\alpha 1\geq 10°$. The radiant flux of the first contribution may be selected from the range of about 10-90% and the radiant flux of the second contribution may also be selected from the range of 10-90%. Of course, both contributions together may be up to 100%, and may be at least about 70% of the total radiant flux. The first contribution may have a first maximum luminous intensity (e.g. in candela) $I_{m1}$ and the second contribution may have a second maximum luminous intensity (e.g. in candela) $I_{m2}$. Especially, in embodiments $I_{m2}/I_{m1}<1$, especially $0.1\leq I_{m2}/I_{m1}\leq 0.9$, more especially $0.2\leq I_{m2}/I_{m1}\leq 0.8$, more especially $0.3\leq I_{m2}/I_{m1}\leq 0.7$.

In embodiments, the light generating system may comprise a control system, wherein the control system has an operational mode. The term "operational mode" may also be indicated as "controlling mode". The system, or apparatus, or device (see further also below) may execute an action in a "mode" or "operational mode" or "mode of operation". Likewise, in a method an action, stage, or step may be executed in a "mode" or "operation mode" or "mode of operation". This does not exclude that the system, or apparatus, or device may also be adapted for providing another operational mode, such as a second operational mode, or a plurality of other operational modes. Likewise, this does not exclude that before executing the mode and/or after executing the mode one or more other modes may be executed. However, in embodiments, a control system (see further also below) may be available, that is adapted to provide at least the operational mode. Would other modes be available, the choice of such modes may especially be executed via a user interface, though other options, like executing a mode in dependence of a sensor signal or a (time) scheme, may also be possible. The operational mode may in embodiments also refer to a system, or apparatus, or device, that can only operate in a single operational mode (i.e. "on", without further tunability).

The control system may in embodiments control the operation of the one or more light generating devices. Especially, one or more of the direction in which the device light is incoupled into the side face and the intensity of the incoupled device light may be controlled. Since incoupled device light may undergo total internal reflection within the lightguide, the angle incidence of the incoupled device light may impact the beam angle of the outcoupled device light from the first lightguide face. Further, the intensity of the outcoupled device light from the first lightguide face may be dependent on the intensity of device light incoupled via the side face. Hence, it may be beneficial to control both the intensity of light incoupled and the angle at which device light is incoupled via the side face. Therefore, in embodiments, the light generating system may comprise a control system. The control system may especially be configured to control light generating device (especially, the light source)

The term "controlling" and similar terms especially refer at least to determining the behavior or supervising the running of an element. Hence, herein "controlling" and similar terms may e.g. refer to imposing behavior to the element (determining the behavior or supervising the running of an element), etc. such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions from a remote control. In embodiments, the control system may be controlled via an App on a device, such as a portable device, like a Smartphone or I-phone, a tablet, etc. The device is thus not necessarily coupled to the lighting system, but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, WIFI, LiFi, ZigBee, BLE or WiMAX, or another wireless technology.

The system, or apparatus, or device may execute an action in a "mode" or "operation mode" or "mode of operation" or "operational mode". The term "operational mode may also be indicated as "controlling mode". Likewise, in a method an action or stage, or step may be executed in a "mode" or "operation mode" or "mode of operation" or "operational mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

The light generating system may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, digital projection, or LCD backlighting. The light generating system (or luminaire) may be part of or may be applied in e.g. optical communication systems or disinfection systems.

In yet a further aspect, the invention also provides a lamp or a luminaire comprising the light generating system as defined herein. The luminaire may further comprise a housing, optical elements, louvres, etc, etc. The lamp or luminaire may further comprise a housing enclosing the light generating system. The lamp or luminaire may comprise a light window in the housing or a housing opening, through which the system light may escape from the housing. In yet a further aspect, the invention also provides a projection device comprising the light generating system as defined herein. Especially, a projection device or "projector" or "image projector" may be an optical device that projects an image (or moving images) onto a surface, such as e.g. a projection screen. The projection device may include one or more light generating systems such as described herein. Hence, in an aspect the invention also provides a light generating device selected from the group of a lamp, a luminaire, a projector device, a disinfection device, a photochemical reactor, and an optical wireless communication device, comprising the light generating system as defined herein. The light generating device may comprise a housing or a carrier, configured to house or support, one or more elements of the light generating system. For instance, in embodiments the light generating device may comprise a housing or a carrier, configured to house or support one or more of the lightguide and/or the reflector.

Instead of the terms "lighting device" or "lighting system", and similar terms, also the terms "light generating device" or "light generating system", (and similar terms), may be applied. A lighting device or a lighting system may be configured to generate device light (or "lighting device light") or system light ("or lighting system light"). As indicated above, the terms light and radiation may interchangeably be used.

The lighting device may comprise a light source. The device light may in embodiments comprise one or more of light source light and converted light source light (such as luminescent material light).

The lighting system may comprise a light source. The system light may in embodiments comprise one or more of light source light and converted light source light (such as luminescent material light).

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF THE EMBODIMENTS

Figure 1:
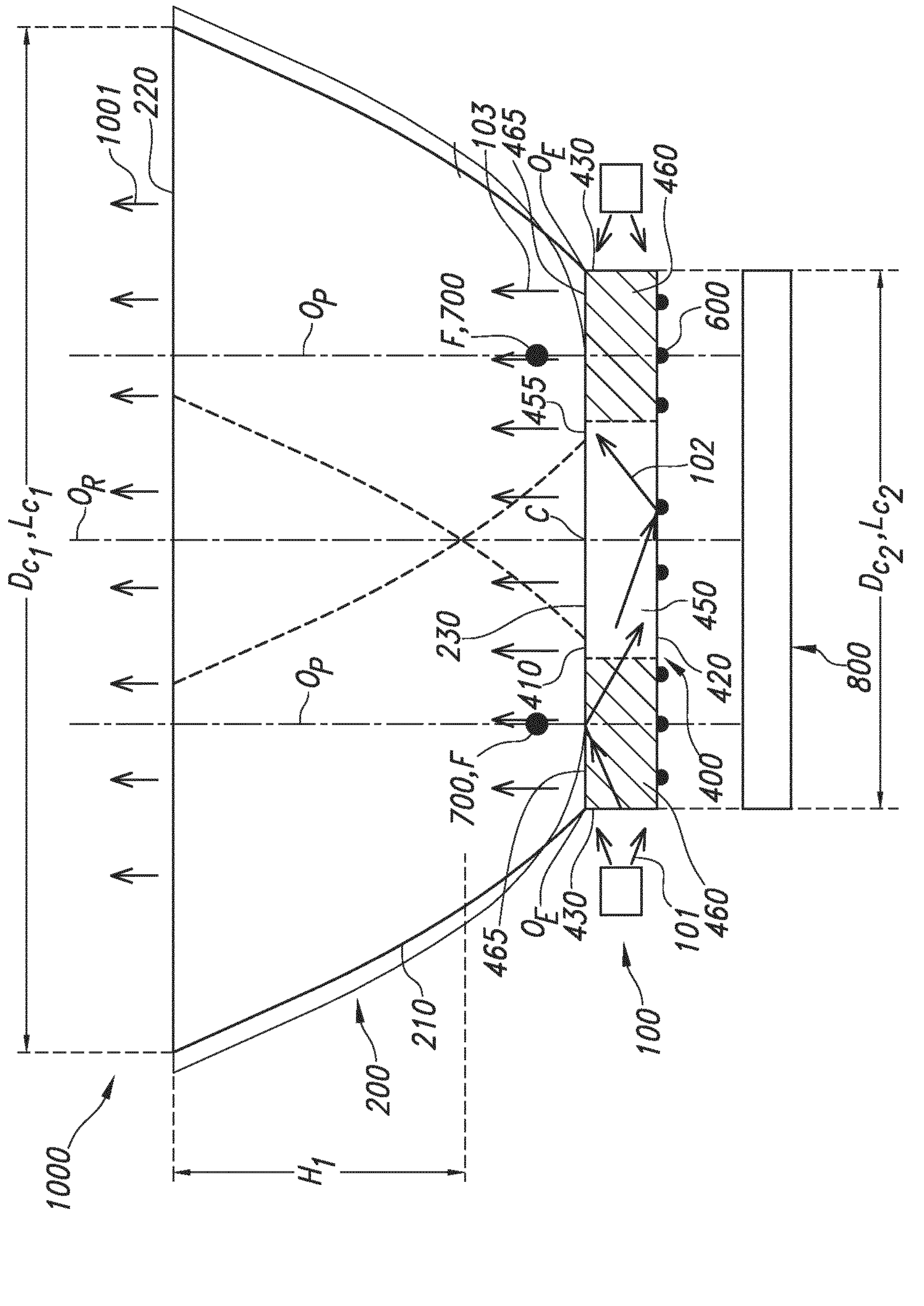
FIG. 1 schematically depict an embodiment of a light generating system.

FIG. 1 schematically depicts a light generating system 1000. In embodiments, the light generating system 1000 may comprise a light generating device 100, a lightguide 400, and a light collimating reflector 200 (or reflector 200). As shown in the figure, the reflector 200 may especially be configured downstream of the lightguide 400, especially the first lightguide face 410.

In embodiments, the light generating device 100 may be configured to generate device light 101. Especially, the light generating device 100 may comprise a solid state light source. In embodiments, solid state light sources may comprise semiconductor light sources, such as a light emitting diode (LED), a laser diode, or a superluminescent diode.

In embodiments, the lightguide 400 may comprise a first lightguide face 410 and a second lightguide face 420. In the embodiment depicted in the figure, the first lightguide face 410 and the second lightguide face 420 are configured parallel. However, in alternative embodiments, the first lightguide face 410 may not (necessarily) be configured parallel to the second lightguide face 420. In the embodiment depicted, the first lightguide face 410 and the second lightguide face 420 are both flat. However, in other embodiments, the first lightguide face 410 and/or the second lightguide face 420 may be curved in one or two directions.

Further, the lightguide 400 may comprise a side face 430 bridging the first lightguide face 410 and the second lightguide face 420.

In embodiments, the lightguide 400 may comprise light outcoupling elements 600 (comprised by one or more of lightguide faces 410,420 and/or arranged in the lightguide 400). In the embodiment depicted, the light outcoupling elements are configured outside the lightguide 400 and in contact with the second lightguide face 420. Note that in embodiments the light outcoupling elements 600 may (also) be arranged within the lightguide 400 and/or at the first lightguide face 410. Alternatively or additionally, in embodiments, the light outcoupling elements 600 may (also) be configured within the lightguide 400 and in contact with the first lightguide face 410 and/or the second lightguide face 420. Yet further, in embodiments, the light outcoupling elements 600 may be configured outside the lightguide 400 and in contact with the first lightguide face 410 and/or the second lightguide face 420. The configuration of the light outcoupling elements in such embodiments are depicted in FIG. 2*b*. The light outcoupling elements 600, may in embodiments reflect or scatter device light 100 in the direction of the first lightguide face 410, thus increasing the device light 101 outcoupled from the lightguide 400 (especially from the first lightguide face 410).

In embodiments, the first lightguide face 410 may comprise a surface area A1. Especially, the first lightguide face 410 may comprise an inner surface part 455 and an outer surface part 465. Especially, the outer surface part 465 may surround the inner surface part 455. In embodiments, the inner surface part 455 may have an inner surface area A11 and the outer surface part 465 may have an outer surface area A12. In embodiments, the outer surface area A12 may be at maximum 10%, such as 20%, especially 40% of the surface area A1. Especially, the amount of outcoupled device light (103) from the first lightguide surface 410 may be different in the inner surface part 455 and the outer surface part 465.

In embodiments, the outer surface area A12 may be selected from the range of 5-30% of the surface area A1. Especially, selected from the range of 60-90% of the outcoupled device light 103 may be coupled out via the outer surface part 465.

Analogously, in embodiments, the inner surface area A11 may be selected from the range of 70-95% of the surface area A1. Especially, selected from the range of 10-40% of the outcoupled device light 103 may be coupled out via the inner surface part 455.

In embodiments, the light generating device 100 and the lightguide 400 may be configured such that device light 101 enters the lightguide 400 via the side face 430. That is, in embodiments, the light generating system 100 may comprise a plurality of light generating devices 100 configured to irradiate different parts of the side face 430. In the figure, two light generating devices 100 are depicted. However, in embodiments, a plurality of light generating devices 100 may be configured in the vicinity of the lightguide 400, especially around the lightguide 400. Furthermore, in alternative embodiments, the light generating devices 100 may also be configured away from the vicinity of the lightguide 400, wherein the device light 101 may be incoupled into the side face of the lightguide 400 by means of one or more optical elements, such as lenses or mirrors.

Hence, in embodiments, the device light 101 may be incoupled into the lightguide 400. Especially, the at least part of incoupled device light 102 may be guided into the lightguide 400, wherein the incoupled device light 102 is guided within the lightguide 400 by means of total internal reflection. Especially, the lightguide 400 may comprise a light transmissive material. In embodiments, the lightguide 400 may comprise one or more of PC, PMMA, and silicone. Other lightguide materials used in embodiments are discussed further above.

The incoupled device light 102 may be coupled out of the lightguide 400 via the first lightguide face 410, or the second lightguide face 420, or via the side face 430. However, in embodiments, at least part of the incoupled device light 102 may be coupled out from the lightguide 400 via the first lightguide face 410 to provide outcoupled device light 103. Especially, the light outcoupling elements 600 may be configured such that the incoupled device light 102 is reflected or scattered by the light outcoupling elements 600 such that at least a part of the incoupled device light 102 is coupled out via the first lightguide face 410. Furthermore, in embodiments, the light outcoupling elements 600 may be configured such that more than 50% of the outcoupled device light 103 may be coupled out via the outer surface part 465.

In embodiments, the reflector 200 may comprise a first reflector side 220, a second reflector side 230, and a reflector wall 210. Especially, the reflector wall 210 may be tapering from the first reflector side 220 to the second reflector side 230. In embodiments, the reflector 200 may comprise an optical axis $O_R$. In embodiments, the reflector wall 210 may be configured around the optical axis $O_R$. Note however, that the reflector wall 210 may be curved such that the focal point F of the reflector wall 210 may not be coincident with the optical axis $O_R$. The focal point F may in embodiments be coincident with an axis OP, wherein the optical axis Op is configured perpendicular to the first lightguide face.

In the not to scale drawing FIG. 1, the focal points F are schematically drawn slightly above the first lightguide face 410. However, the may also be right on the first lightguide face 410, or within the lightguide 400.

The reflector wall 210 in the cross-sectional plane may in embodiments have a semi-parabola-like shape. Here, the semi-parabola-like shape may refer to the reflector wall 210 having a profile that is part of a parabola. A part of the cross-section of the complete parabola is depicted in the figure using dashed lines, wherein the focal point F of the reflector wall is located where the focal point of such a (complete) parabolic reflector would have been located. Furthermore, the axis Op may be considered the optical axis of the aforementioned (fictional) parabolic reflector. This may be referred to as semi-parabola-like shape. Especially, each section of the reflector wall 210 may have a semi-parabola-like shape such that each section of the reflector may have a unique focal point F. Hence, in embodiments, the axis Op may be defined such that the rotation of the semi-parabola-like reflector wall 210 (in the cross-section) provides the parabola-like shape (of the reflector 200). Especially, the semi-parabola-like shape may be translated in a direction perpendicular to the optical axis $O_R$ and (then) rotated to provide the parabola-like shape. In embodiments, the axis Op may be defined perpendicular to the first lightguide face 410 and passing through the outer surface part 465. Furthermore, the locus of the focal points (F) may especially form a closed curve.

In the figure depicted, a second reflector wall cross section is shown. The second reflector wall is only depicted for the sake of comparison and is not an embodiment of the light generating system 1000. The second reflector wall has a parabolic shape i.e., the walls of the second reflector are part of a single parabolic curve. Hence, from the figure, it can be observed that the semi-parabola-like shape is different from that of a parabolic shape.

In specific embodiments, a cross-section of the reflector wall 210 with a plane through the optical axis $O_R$ provides a semi-parabola-like shape, wherein a rotation of the semi-parabola-like shape about an axis Op perpendicular to the outer surface part 465 and penetrating through the outer surface part 465 provides a parabola-like shape having a focus (F) coincident with the locus 700. The focus F of the semi-parabola-like shape of the reflector wall 210 at any location of the reflector wall 210 may be coincident with the locus 700, wherein a projection of the locus 700 on the first lightguide face may in embodiments lie closer to the outer surface part 465 than the optical axis $O_R$. Furthermore, in embodiments, the projection of the locus 700 may lie on the outer surface part 465. Since a majority of the outcoupled device light 103 is outcoupled from the outer surface part 465, the majority of the outcoupled device light 103 may be outcoupled in a direction passing through the locus 700 of foci F, hence increasing the amount of light outcoupled form the periphery of the light generating system 1000.

Figure 3:
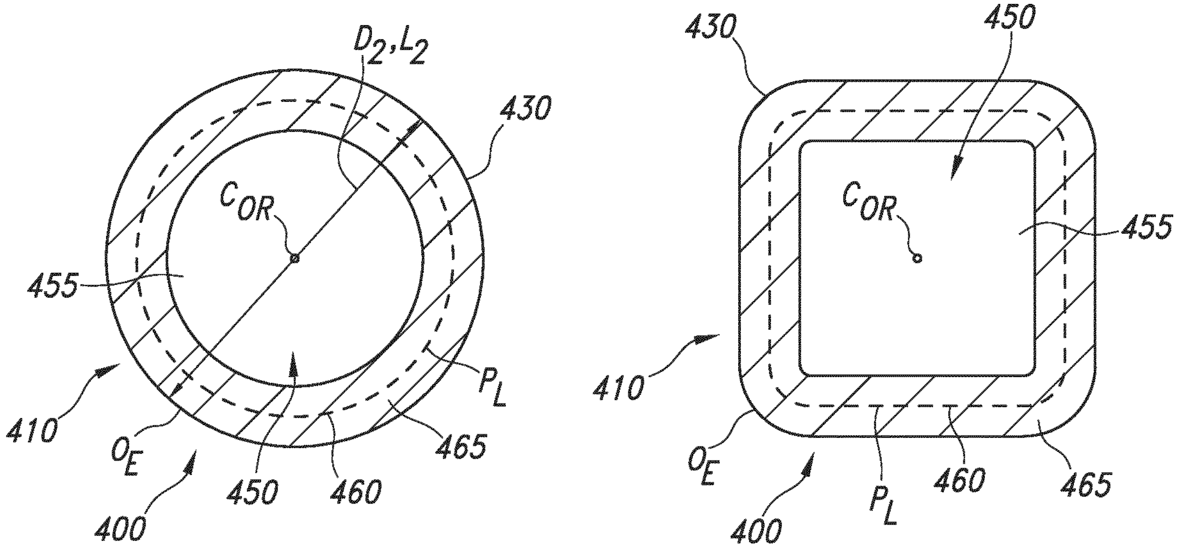
FIG. 3 schematically shows a cross-section of the light generating system 1000 perpendicular to the optical axis $O_R$.

In embodiments, the reflector 200 may have an axis-symmetric geometry axis-symmetric about the optical axis $O_R$. For example, in embodiments, the reflector may have a circular-cross-section. However, in other embodiments, the reflector 200 may not have an axis-symmetric geometry. Especially, the reflector (and/or the lightguide 400) may have a cross-sectional shape selected from circular or n-gonal (for example tetragonal, hexagonal, etc), wherein n is at least 4. Embodiments with different cross-sectional shapes of the reflector 200 and the lightguide 400 are depicted in FIG. 3. In embodiments, the reflector 200 and the lightguide 400 may have the same cross-sectional shape. This may provide the benefit of maximizing the amount of device light incoupled 101 into the second reflector face 230 from the first lightguide face 410.

As mentioned above, the reflector 200 may be tapering from the first reflector side 220 to the second reflector side 230. In embodiments, the first reflector side 220 may have a larger area than the second reflector side 230. Note that in some embodiments the first reflector side 220 and the second reflector side 230 may be circular. However, in other embodiments, the first reflector side 220 and the second reflector side 230 may not be circular as well. Hence, in embodiments, the first reflector side 220 and the second reflector side 230 may be defined by a circular equivalent diameter Dc1 and Dc2, respectively. Especially, the first reflector side 220 may be larger than the second reflector side 230, such that $0.6 \leq Dc2/Dc1 \leq 0.95$. Alternatively, in embodiments where the reflector 200 does not have an axis-symmetric cross-section, the first reflector side 220 and the second reflector side 230 may have a first (length) dimension Lc1 and a second (length) dimension Lc2, respectively. For example, the reflector 200 may have a rectangular cross-section where the length and the width of first reflector side 220 (and the second reflector side 230) may be different.

Further, in embodiments, the reflector 200 may be hollow wherein the first reflector side 220 and the second reflector side 230 may both be open (as depicted in the figure). Especially, the outcoupled device light 103 may be outcoupled from the light generating device 1000 via a reflection at the reflector wall 210. However, in other embodiments, the reflector 200 may be a light transmissive body wherein the outcoupled device light 103 may enter the light transmissive body via the second reflector side 230 and be outcoupled via the first reflector side 220. Especially, (in such an embodiment) the outcoupled device light 103 may be reflected at the reflector wall 210 by means of total internal reflection.

Hence, in specific embodiments, the first reflector side 220 has a first circular equivalent diameter Dc1, where the second reflector side 230 has a second circular equivalent diameter Dc2, wherein $0.6 \leq Dc2/Dc1 \leq 0.95$, wherein the reflector 200 comprises a hollow reflector or a light transmissive body.

In embodiments, the reflector may comprise a height H1 defined in a perpendicular direction between the first reflector side 220 and the second reflector side 230. Especially, the height H1 may be defined such that $0.1 < H1/Dc1 \leq 0.33$.

In embodiments, the first reflector side 220 may be configured further away from the first lightguide face 410 than the second reflector side 420. As described above, the reflector 200 may especially facilitate beam shaping the outcoupled device light 103 emanating from the first lightguide face 410.

In embodiments, the lightguide 400 may comprise a central point C and an outer edge OE. Especially, the central point C may lie in the center of the first lightguide face 410. However, in alternative embodiments, the central point C may (also) be a central point around which other elements (for example light outcoupling elements 600) are configured. In embodiments, the light outcoupling elements may be arranged such that with increasing radial distance from the central point C a density of the outcoupling elements 600 increases. Note that there may be different configurations (or arrangements) of the light outcoupling elements 600. Especially, there may be modulations to the distribution of the light outcoupling elements 600. Such embodiments are discussed in FIG. 2*c*.

Here, density may refer to either a surface density and/or a volume density. Surface density in a region may be defined as the percentage of the surface area of the region covered by the light outcoupling elements 600. Further, volume density in a region may be defined as the percentage of the volume of the region occupied by the light outcoupling elements 600. A quantitative measure of the density of the light outcoupling elements 600 is discussed further below.

Especially, the increase in density of the outcoupling elements 600 may be gradual or stepwise. Here, gradual refers to a smooth increase in the density of the light outcoupling elements 600 with distance. Further, a stepwise increase may refer to a discrete increase in the density wherein the lightguide is discretized into bins, wherein the density of the light outcoupling elements 600 remains relatively constant within a bin, however, a bin situated further away from the central point C may have a higher density than another bin located closer to the central point C. In such an embodiment, the increase in density may be stepwise between two adjacent bins. Hence, in this way, the increase in density may in embodiments be gradual or stepwise.

In embodiments, the density of the light outcoupling elements 600 may be different in one or more of the size of the light outcoupling elements 600 and/or the number of light outcoupling elements. In embodiments, at least part of a total number of the light outcoupling elements 600 may be arranged in the lightguide 400. Especially, at least part of the total number of light outcoupling elements 600 may be enclosed by the lightguide 400. FIG. 2*b* embodiment II depicts such an embodiment where the light outcoupling elements 600 are arranged within the lightguide 400.

Further, in embodiments, the light outcoupling elements 600 may be comprised by the first lightguide face 410.

Especially, the light outcoupling elements 600 may be arranged within the lightguide 400 and in contact with the first lightguide face 410. Alternatively, the light outcoupling elements 600 may be arranged outside the lightguide 400 and in contact with the first lightguide face 410 (such as depicted in FIG. 2*b* embodiment I). Yet further, in embodiments, the light outcoupling elements 600 may be arranged within the lightguide 400 and may protrude out via the first lightguide face 410. FIG. 2*b* embodiment III depicts such an embodiment where the light outcoupling elements 600 are comprised by the first lightguide face 410.

Analogously, in embodiments, the light outcoupling elements 600 may be comprised by the second lightguide face 420. Especially, the light outcoupling elements 600 may be arranged within the lightguide 400 and in contact with the second lightguide face 420. Alternatively, the light outcoupling elements 600 may be arranged outside the lightguide 400 and in contact with the second lightguide face 410 (such as depicted in FIG. 2*b* embodiment III). Yet further, in embodiments, the light outcoupling elements 600 may be arranged within the lightguide 400 and may protrude out via the second lightguide face 420.

In summary, in embodiments, one or more of the following may apply, wherein (a) at least part of the total number of light outcoupling elements 600 may be arranged in the lightguide 400, (b) at least part of the total number of the light outcoupling elements (600) may be comprised by the first lightguide face 410, and (c) at least part of the total number of the light outcoupling elements 600 may be comprised by the second lightguide face 420.

Further, in embodiments, the light generating system may comprise an auxiliary reflector 800. Especially, the auxiliary reflector 800 may be flat and may be reflective for outcoupled device light 103. In embodiments, the auxiliary reflector 800 may be configured especially closer to the second lightguide face 420 than the first lightguide face 410. Hence, the outcoupled device light 102 may especially be reflected back into the lightguide 400. This may especially minimize the amount of device light 101 (or outcoupled device light 103) escaping the lightguide 400 via the second lightguide face 420. Therefore, in embodiments, the auxiliary reflector 800 may increase the amount of outcoupled device light 103 outcoupled via the first lightguide face 410.

In embodiments, the lightguide 400 may comprise an inner lightguide part 450 and an outer lightguide part 460. Especially, the inner lightguide part 450 may be surrounded by the outer lightguide part 460. Especially, the inner surface part 455 may in embodiments be comprised by the inner lightguide part 450. Likewise, the outer surface part 465 may in embodiments be comprised by the outer lightguide part 460.

In embodiments, the light outcoupling elements 600 may be arranged in the inner lightguide part 450 with a first volume density d1v. Further, in embodiments, the light outcoupling elements 600 may be arranged in the outer lightguide part 460 with a second volume density d2v. Especially, the first volume density d1v and the second volume density d2v may be selected such that d2s/d1s≥1.5. Especially, the density may be defined as $N_v*D_{eq}/V$, wherein $N_v$ refers to the number of the light outcoupling elements 600 in the respective lightguide part 450,460, $D_{eq}$ refers to the equivalent spherical diameters of the light outcoupling elements 600 in the respective lightguide parts 450, 460, and V refers to the volume of the respective lightguide parts 450,460, and wherein d2v/d1v≥1.5.

In embodiments, the light outcoupling elements 600 may comprise reflective particles 601 (see also FIG. 2*b* embodiment II). In embodiments, the reflective particles 601 may be arranged in the lightguide 400. In embodiments, the reflective particles 601 may be different in size and shape. Especially, the reflective particles 601 have spherical equivalent diameters selected from the range of 2-200 μm, such as 3-30 μm, such as 5-25 μm, especially 10-20 μm.

In embodiments, the light outcoupling elements 600 may be arranged on one or more of the first lightguide face 410 and the second lightguide face 420. In embodiments, the light outcoupling elements 600 related to the inner lightguide part 450 may have a first surface density d1s. Likewise, the light outcoupling elements 600 related to the outer lightguide part 460 may have a second surface density d2s.

In embodiments, the density may be defined as $N_a*D_{eq}/A$, wherein $N_a$ refers to the number of the light outcoupling elements 600 related to the respective lightguide parts 450, 460, $D_{eq}$ refers to the circular equivalent diameters of the light outcoupling elements 600 related to the respective lightguide parts 450, 460 and defined parallel to the first lightguide face 410, and A refers to the respective surface areas A11 and A12.

In embodiments, the light outcoupling elements 600 may comprise reflective structures 602 comprised by one or more of the first lightguide face 410 and the second lightguide face 420. Especially, the reflective structures 602 may comprise dots. Especially, the reflective structures 602 may have a circular equivalent diameter selected from the range of 0.1-5 mm, such as 0.2-2 mm, especially 0.5-1 mm.

In embodiments, the light generating system 1000 may be configured to generate system light 1001. Especially, system light 1001 may comprise the outcoupled device light 103. In embodiments, the light generating system 1000 may be configured to generate a beam of system light 1001 (with at least one cross-section perpendicular to the optical axis $O_R$) with a full width at half maximum selected from the range 10-50°.

Figure 2A:
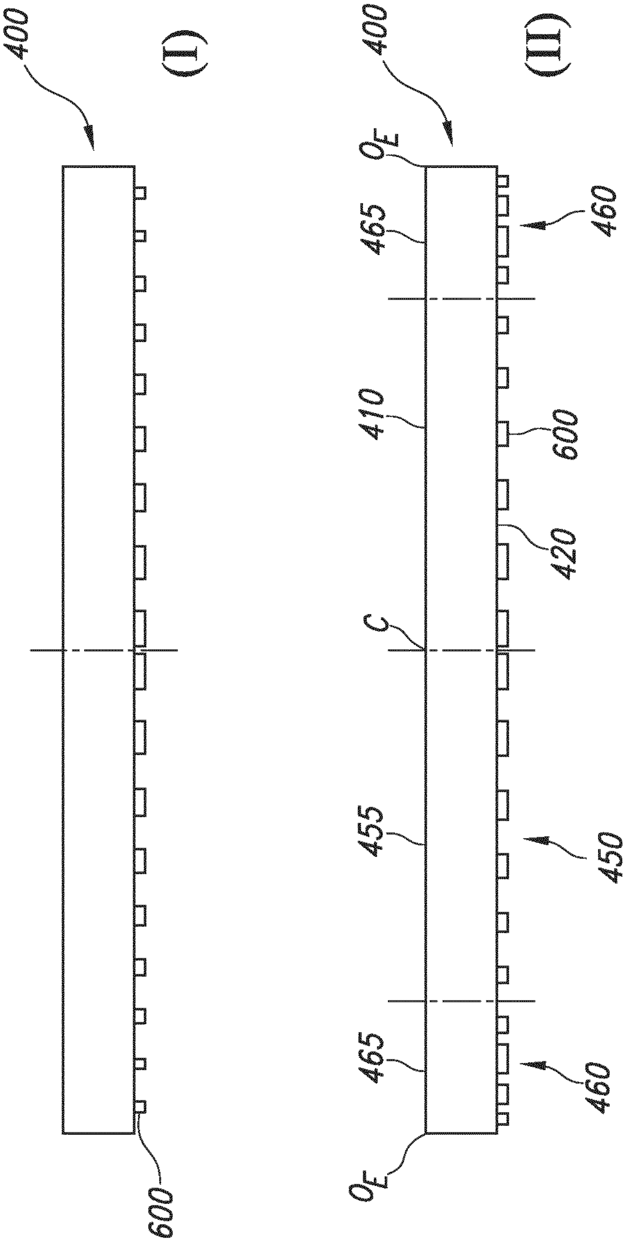
FIG. 2A-C schematically depicts embodiments of the lightguide 400.
Figure 2B:
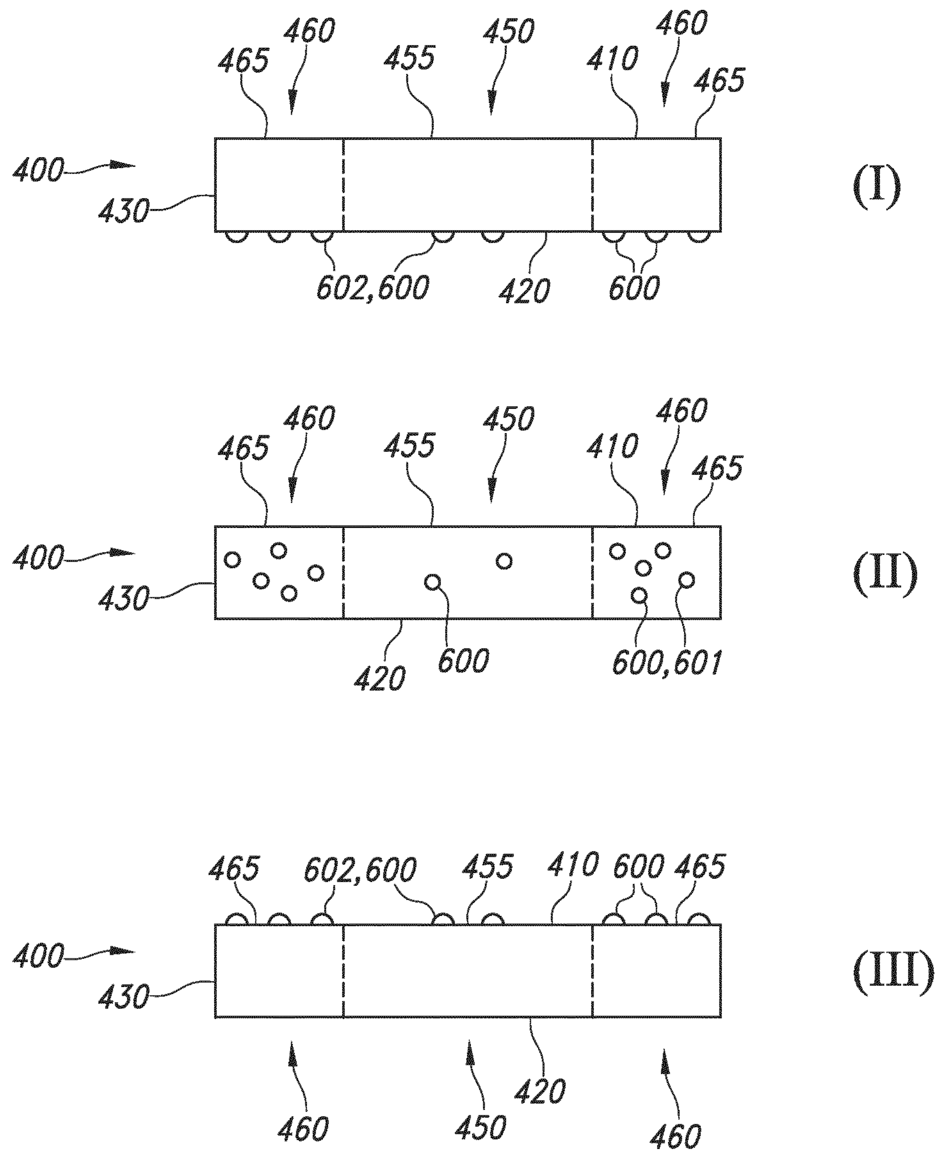
Figure 2C:
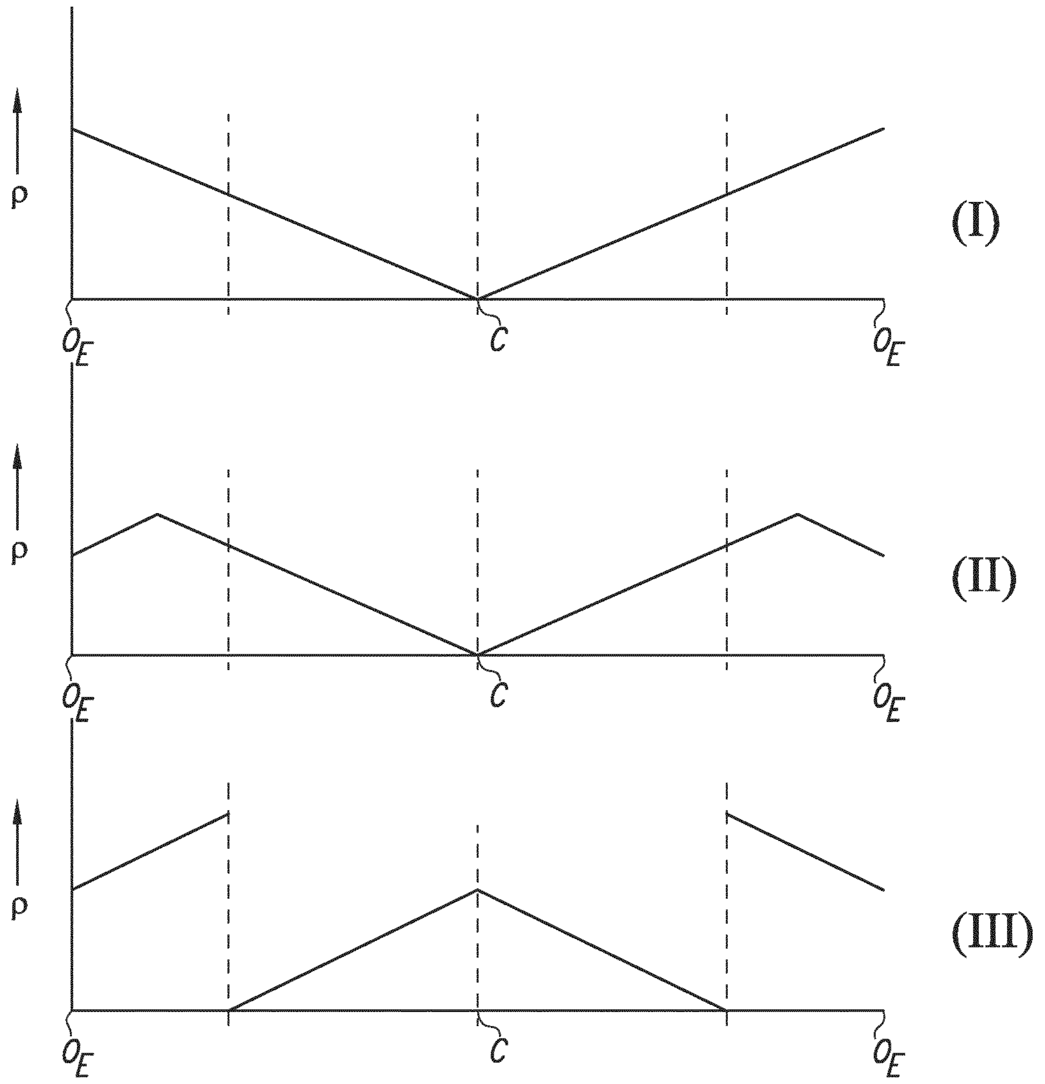

FIG. 2A-C schematically depicts embodiments of the lightguide 400.

FIG. 2A depicts two lightguides I and II, wherein lightguide II is an embodiment of the present invention and lightguide I is a conventional lightguide 400 (for comparison). In a conventional lightguide 400, the density of the light outcoupling elements 600 may be increasing from the outer edge to the center of the lightguide 400. Contrary to this, in embodiments, the lightguide 400 (such as in the present invention) may especially have a decreasing density of light outcoupling elements 600 from the outer edge OE to the central point C. In the conventional lightguide 400, the increase in density of the light outcoupling elements 600 may increase the amount of light outcoupled from the central part of the lightguide 400. However, in embodiments of the present invention, the increased density of the light outcoupling elements 600 near the outer edge OE may increase the amount of outcoupled device light 103 from the outer surface part. Especially, the reflector 200 may be configured downstream of the first lightguide face 410. Hence, by outcoupling more light from the outer surface part 465, a collimated beam of system light 1001 may be provided.

FIG. 2B depicts the configuration of light outcoupling elements 600 comprised by the lightguide 400. In embodiments, the lightguide 400 may comprise light outcoupling elements 600. As mentioned before, in embodiments, the lightguide 400 may comprise an inner lightguide part 450 and an outer lightguide part 460. Especially, the inner surface part 455 may be comprised by the inner lightguide part 450. Likewise, the outer surface part 465 may be comprised by the outer lightguide part 460. In embodiments, the first lightguide face 410 may comprise a surface area A1. Especially, the inner surface part 455 may have an inner surface area A11, and the outer surface part 465 may have an outer surface area A12. Especially, the outer surface area A12 is at maximum 40% of the surface area A1.

In embodiments, the light outcoupling elements 600 may be comprised by the lightguide 400. Especially, the light outcoupling elements 600 may be configured in one or more different configurations. The following embodiments I-III, depict such embodiments.

In embodiment I, the lightguide 400 comprises light outcoupling elements 600 configured (or arranged) on the second lightguide face 420, wherein the light outcoupling elements 600 are arranged outside the lightguide 400. Especially, the light outcoupling elements 600 may comprise reflective structures 602. The reflective structures 602 may in embodiments reflect (and/or scatter) the incoupled device light 102 back into the lightguide 400. Hence, the incoupled device light 102 may be reflected (or scattered) at the second lightguide face 420, thereby increasing the amount of outcoupled device light 103 from the first lightguide face 410.

In embodiment II, the lightguide 400 comprises light outcoupling elements 600 configured (or arranged) within the lightguide. Especially, the light outcoupling elements 600 may comprise reflective particles 601. The reflective particles 601 may scatter or reflect incoupled device light 102 in a downstream direction towards the first lightguide face 410. Hence, the amount of outcoupled device light 103 from the first lightguide face 410 may be increased.

In embodiment III, the lightguide 400 comprises light outcoupling elements 600 configured (or arranged) on the first lightguide face 410, wherein the light outcoupling elements 600 are arranged outside the lightguide 400. Especially, the light outcoupling elements 600 may comprise reflective structures 602. The reflective structures 602 may in embodiments scatter the incoupled device light 102 out via the first lightguide face 410. Hence, the incoupled device light 102 may scattered at the first lightguide face 410, thereby providing diffuse outcoupled device light 103. Furthermore, in embodiments, the reflective structures 602 configured in (or on) the first lightguide face 410 may reflect incoupled device light 102 incident at the first lightguide face 410 back into the lightguide 400. This may provide the benefit of controlling the amount of incoupled device light 102 outcoupled via the first lightguide face 410. In this way, the amount of device light 101 outcoupled from one or more of the respective lightguide parts 455,465 may be limited.

FIG. 2C schematically depicts the variation of the density of the light outcoupling elements from a point on the outer edge OE to the central point C. In the figures depicted, the vertical axis shows the density of the light outcoupling elements p and the horizontal axis shows the distance from the one (outer) edge OE on one end of the cross-section of the lightguide to the opposite (outer) edge OE. The dashed vertical line through the central point C may be coincident with the optical axis $O_R$. Further, the two other dashed vertical lines indicate the demarcation between the inner surface part 455 and the outer surface part 465.

In embodiment I, as mentioned before, the density of the light outcoupling elements 600 may increase from the central point C towards the outer edge OE. The higher density of the light outcoupling elements 600 in the outer surface part 465 may increase amount of outcoupled device light 1003 outcoupled from the outer surface part 465. Note, that the locus 700 of foci F (of the reflector 200) lies closer to the outer surface part 465 as compared to the central point C. Hence, the majority of the outcoupled device light 103 may pass through the locus 700 of foci F, which may thus provide a collimated beam of light.

Embodiment II depicts a first modulation of the distribution of light outcoupling elements 600. In this embodiment, the density of the light outcoupling elements 600 may increase from the central point C to a point defined in the outer surface part 465. Moving further towards the edge OE beyond said point, there is a decrease in density of the light outcoupling elements 600. Note that, in embodiments, despite the decrease in the density of light outcoupling elements 600 in a part of the outer surface part 465 (i.e., local density), the density of the light outcoupling elements 600 over the (entire) outer surface part may still be higher that the density of light outcoupling elements 600 in the (entire) inner surface part. The density of the light outcoupling elements 600 may especially be high in the vicinity of the locus 700 of foci F. Thus, increasing the amount of outcoupled device light 103 outcoupled from the part of the outer surface part 465 closest to the locus 700 of foci F.

Embodiment III depicts a second modulation of the distribution of the light outcoupling elements 600. In this embodiment, the density of light outcoupling elements 600 over the (entire) outer surface part 465 may be higher than the density of light outcoupling elements 600 over the (entire) inner surface part 455. However, in both the inner surface part 455 and the outer surface part 465, the density of the light outcoupling elements 600 decreases with increasing distance from the central point C. That is, in embodiments, the inner surface part 455 and the outer surface part 465 may be divided into bins, where each bin is a region bounded by two concentric contours. Similarly, the inner lightguide part 450 and the outer lightguide part 460 may be divided into bins, wherein each bin is bounded by concentric surfaces. The density of the light outcoupling elements 600 configured within each bin may be different.

In embodiments, in the outer surface part 465, the peak (local) density of light outcoupling elements 600 may be located at a point closest to the locus 700 of foci F. Hence, increasing the amount of outcoupled device light 103 outcoupled from the outer surface part 465. However, in addition to the light outcoupled from the outer surface part 465, the light outcoupled from the inner surface part 455 may (also) be increased. In the inner surface part 455, the highest density of light outcoupling elements 600 may be located at the central point C, which may increase the light outcoupled from the inner surface part, such that a homogenous intensity of light may be outcoupled from the first lightguide face 410.

FIG. 3 schematically shows cross-sections of the lightguide 400 in a plane perpendicular to the optical axis $O_R$. The lightguide 400 may comprise the inner lightguide part 450 and an outer lightguide part 460. Especially, the inner lightguide part 450 may comprise an inner surface part 455 and the outer lightguide part 460 may comprise the outer surface part 465. The density of the light outcoupling elements 600 comprised by the lightguide 400 may increase with radial distance from the central point C. In embodiments, the reflector 200 may be configured downstream of the first lightguide face 410.

As mentioned before, in embodiments, the reflector 200 may comprise foci F coincident with the locus 700, wherein the locus 700 is a continuous closed curve. Especially, the locus 700 may have a perimeter PL. More especially, a projection of the locus 700 on the first lightguide face 410 along the optical axis $O_R$ may especially lie on the outer surface part 465. Hence, in this way, (the majority of) the outcoupled device light 103 may especially pass through the focal point F of the reflector 200, thereby increasing the intensity of outcoupled device light 103 outcoupled from the outer lightguide part 465.

Further, in embodiments, the shape of the lightguide 400 may be similar to the shape of the reflector 200. This may provide the benefit that nearly all the outcoupled device light 103 is incoupled into the reflector 200, thus, maximizing the amount of system light 1001 outcoupled from the reflector 200. The embodiment on the left depicts a lightguide 400 having a circular cross-section. The embodiment on the right depicts a lightguide 400 having a tetragonal-like (i.e. a square with rounded corners) cross-section.

Figure 4:
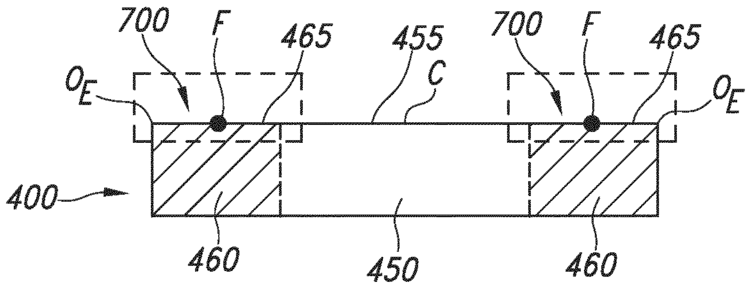
FIG. 4 schematically depicts the lightguide 400.

FIG. 4 schematically depicts the lightguide 400. As mentioned above, the lightguide comprises an inner lightguide part 450 and an outer lightguide part 460. Especially, the inner lightguide part 450 may comprise the inner surface part 455 and the outer lightguide part 460 may comprise the outer surface part 465. The reflector wall 210 may comprise a focal point F. Especially, a projection of the focal point F (or the locus 700 of foci F) on the first lightguide face 410 may lie on the outer surface part 465. Note that the focus F may not lie on the first lightguide face 410. Especially, the focal point F may be located at a position above the outer surface part 465. Further, in some embodiments, the locus 700 may (even) lie outside the outer surface part 465 (i.e., the locus 700 may surround the outer surface part 465). The dashed box indicates the region where the focal point F may lie.

Figure 5B:
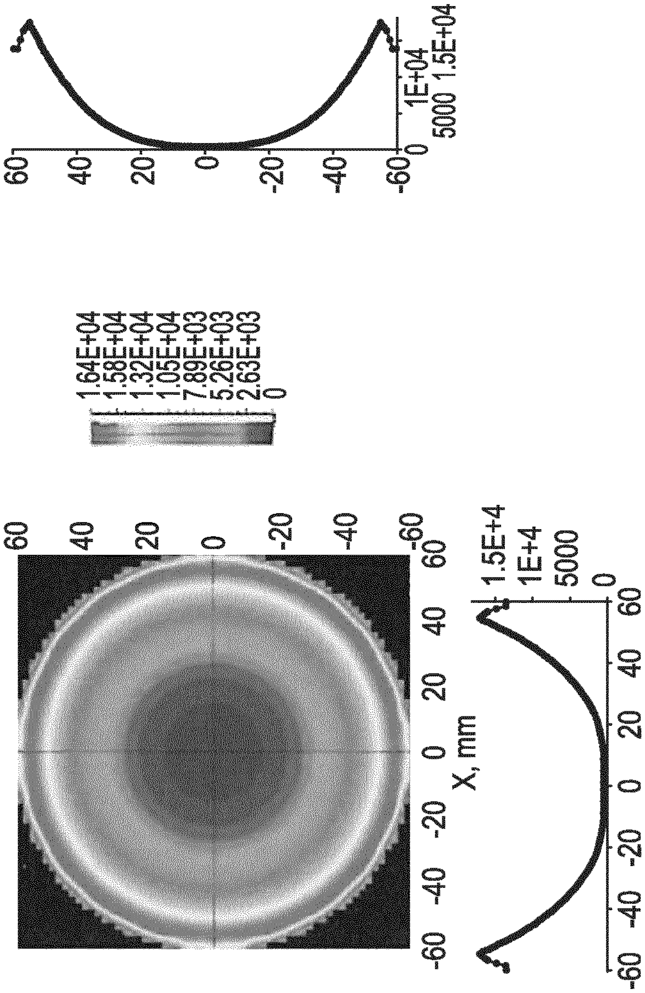
FIG. 5A-B depicts an angular distribution of outcoupled device light 103 diagram and light intensity distribution of the outcoupled device light 103 from the lightguide 400 comprised by the light generating system 1000.
Figure 5A:
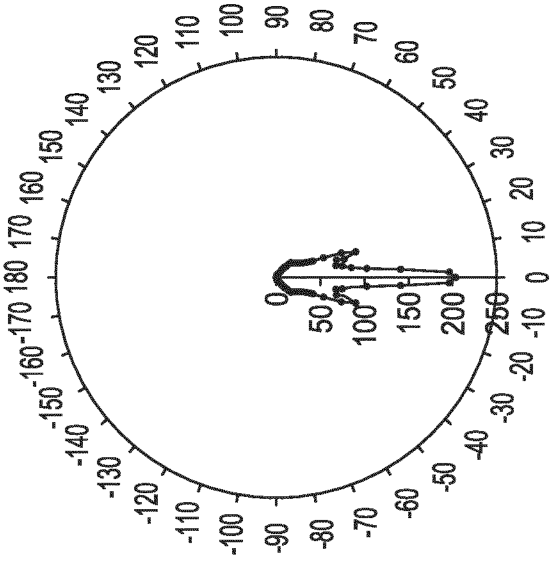

FIG. 5A-B shows an angular distribution of outcoupled device light 103 and light intensity distribution of the outcoupled device light 103 from the lightguide 400 comprised by the light generating system 1000. FIG. 5A shows the angular light distribution of the outcoupled device light 103 from the lightguide 400, and FIG. 5B shows the distribution of the intensity of outcoupled device light 103 from the first lightguide face 410. As shown in FIG. 5B, the intensity of outcoupled device light 103 is significantly higher in the outer surface part 465 as compared to the inner surface part 455. Hence, the majority of the light outcoupled from the first lightguide face 410 may especially be outcoupled from the outer surface part 465. This provides the benefit that the majority of the outcoupled device light 103 may be incident or may pass through the focus of the reflector 200 configured downstream of the first lightguide face 410. Hence, a focused beam of light with a narrower beam angle (as compared to a conventional lighting system) may be provided. For comparison, a lightguide in a conventional lighting system is provided in FIG. 6.

Figure 6B:
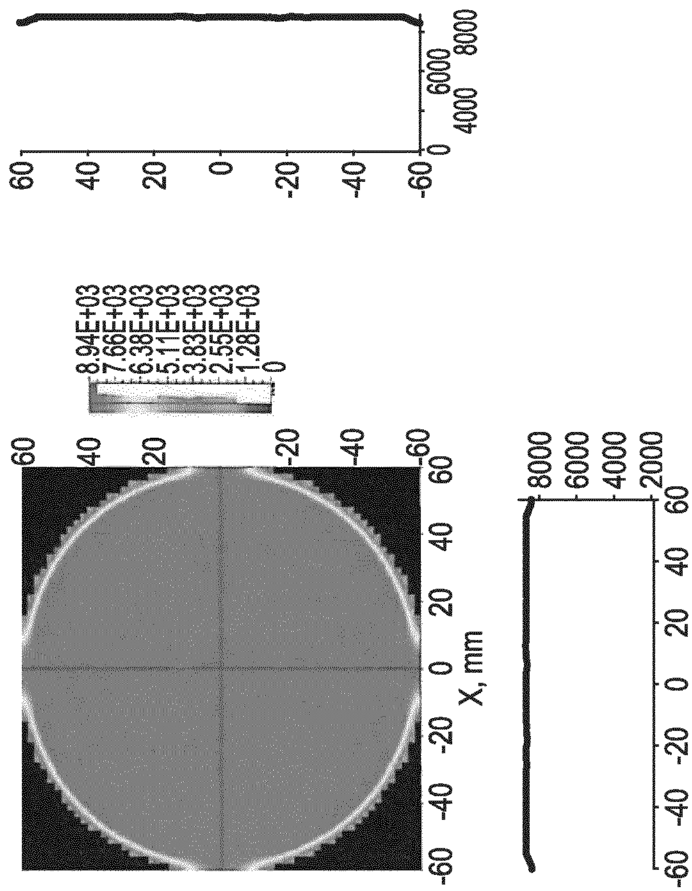
FIG. 6A-B depicts an angular distribution of outcoupled device light 103 and light intensity distribution of the outcoupled light from the lightguide of a conventional lighting system.
Figure 6A:
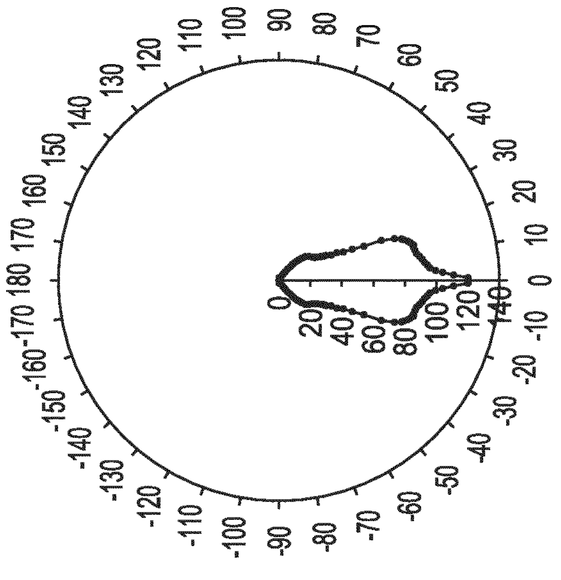

FIG. 6A-B shows an angular distribution of outcoupled device light and light intensity distribution of the outcoupled light from the lightguide of a conventional lighting system. FIG. 6A shows the angular distribution of the light outcoupled from a lightguide, and FIG. 6B shows the distribution of the intensity of light outcoupled from the lightguide surface. In a conventional lightguide, the intensity of light outcoupled from the lightguide may especially not be high at the periphery as compared to the rest of the lightguide, as indicated by the lower light intensity at the edges of the lightguide. Hence, as a result, the light outcoupled from such a light generating system may not provide a sharp beam. That is, as seen in FIG. 6A, the light outcoupled may have a wider beam angle. In such lightguides, the majority of the light outcoupled from the lightguide may not be incident or pass through the focus of a reflector configured downstream of the lightguide. Alternatively, by means of the present light generating system 1000, the majority of the outcoupled device light 103 may be outcoupled from the outer lightguide part 465 (as seen in FIG. 5B). As mentioned before, this may result in the majority of the outcoupled device light 103 passing through the focal point F of the reflector 200 configured downstream of the lightguide 400. Thus, improving efficiency and the luminescence of the light generating device 1000.

Figure 7:
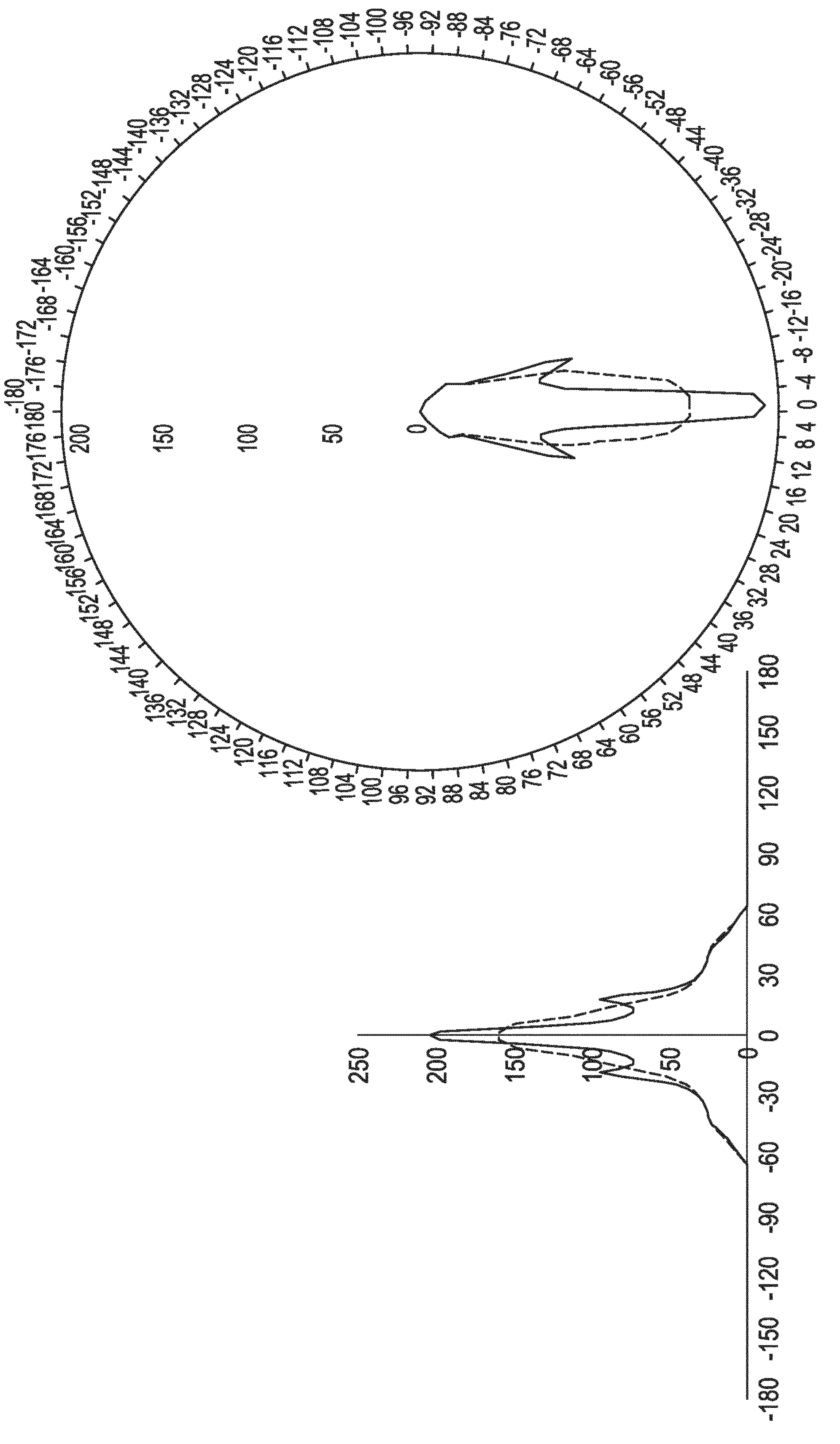
FIG. 7 depicts a comparison of the angular distribution of the intensity of outcoupled device light 103 between an embodiment of the light generating system 1000 and a conventional lightguide.

FIG. 7 depicts a comparison of the angular distribution of the intensity of outcoupled device light 103 between an embodiment of the light generating system 1000 and a conventional lightguide. The figure depicts the aforementioned distribution in a cartesian coordinate system (left) and a polar coordinate system (right). In both figures, it can be observed that the present light generating system 1000 provides a focused and narrow beam. Especially, the intensity of system light 1000 (comprising the outcouple device light 103) may be much higher than that of a conventional lightguide within a narrow beam angle, for example in the range 0-20° (as observed in the figure on the left). Especially, the intensity of outcoupled device light may be significantly higher, for example in the range 0-5° (as observed in the figure on the right). In embodiments of the luminaire (comprising the light generating system), system light may be outcoupled via an exit window comprised by the luminaire. Especially, a narrow beam of system light may be outcoupled via the exit window. More especially, in a direction perpendicular to the exit window of the luminaire, system light of high intensity (compared to a conventional light system) under small angles (such as 0-20°, especially) 0-5° relative to a normal to the exit window may be provided.

In embodiments, with a smaller percentage A12/A1 a more narrow beam of system light may be outcoupled. Suitable percentage have been described further above.

Analogously, in embodiments, ratio of the height of the reflector H1 to the circularly equivalent diameter Del may influence the beam angle of the outcoupled system light i.e., at a larger ratio of H1/Dc1 a more narrow beam of system light may be outcoupled. Suitable ratios have been described further above. Hence, in this way a narrow beam of system light may be outcoupled by increasing the ratio of Dc2/Dc1 and/or H1/Dc1.

Figure 8:
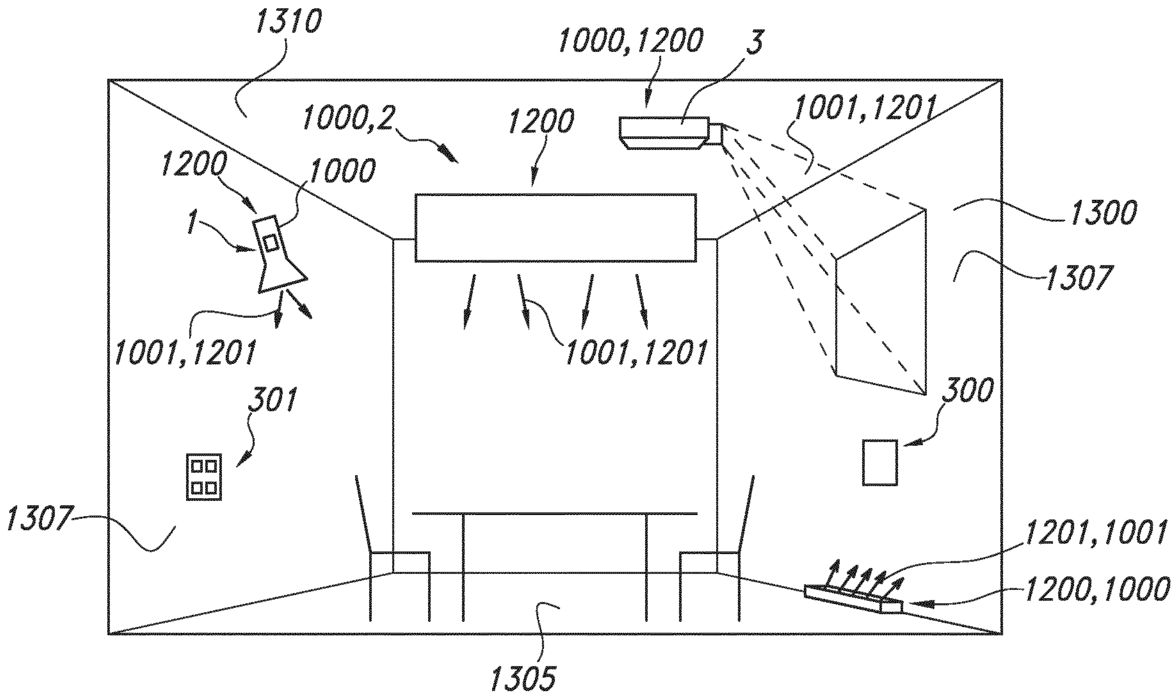
FIG. 8 schematically depicts embodiments of a lighting device and of an indoor space. The schematic drawings are not necessarily to scale.

FIG. 8 schematically depicts an embodiment of a luminaire 2 comprising the light generating system 1000 as described above. Reference 301 indicates a user interface which may be functionally coupled with the control system 300 comprised by or functionally coupled to the light generating system 1000. FIG. 8 also schematically depicts an embodiment of lamp 1 comprising the light generating system 1000. Reference 3 indicates a projector device or projector system, which may be used to project images, such as at a wall, which may also comprise the light generating system 1000. Hence, FIG. 8 schematically depicts embodiments of a lighting device 1200 selected from the group of a lamp 1, a luminaire 2, a projector device 3, a disinfection device, a photochemical reactor, and an optical wireless communication device, comprising the light generating system 1000 as described herein. In embodiments, such lighting device may be a lamp 1, a luminaire 2, a projector device 3, a disinfection device, or an optical wireless communication device. Lighting device light escaping from the lighting device 1200 is indicated with reference 1201. Lighting device light 1201 may essentially consist of system light 1001, and may in specific embodiments thus be system light 1001. Reference 1300 refers to a space, especially an indoor space, such as a room.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage. In yet a further aspect, the invention (thus) provides a software product, which, when running on a computer is capable of bringing about (one or more embodiments of) the method as described herein.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A light generating system comprising a light generating device, a lightguide, and a light collimating reflector, wherein:

the light generating device is configured to generate device light; wherein the light generating device comprises a solid state light source;

the lightguide comprises a first lightguide face, a second lightguide face, and a side face bridging the first lightguide face and the second lightguide face; wherein the lightguide comprises light outcoupling elements;

the first lightguide face comprises a surface area A1; the first lightguide face comprises (a) an inner surface part, having an inner surface area A11, and (b) an outer surface part, surrounding the inner surface part, having an outer surface area A12; wherein the outer surface area A12 is at maximum 40% of the surface area A1;

the light generating device and the lightguide are configured such that (i) device light enters the lightguide via the side face, to provide incoupled device light, wherein the lightguide is configured to guide at least part of the incoupled device light via total internal reflection; and (ii) at least part of the incoupled device light is coupled out from the lightguide via the first lightguide face to provide outcoupled device light, wherein the light outcoupling elements are configured such that more than 50% of the outcoupled device light is coupled out via the outer surface part; and the light collimating reflector comprises a first reflector side, a second reflector side, and a reflector wall tapering from the first reflector side to the second reflector side; wherein the first reflector side and the second reflector side are both open; wherein the first reflector side is configured further away from the first lightguide face than the second reflector side; and wherein the light collimating reflector is configured to beamshape at least part of the outcoupled device light emanating from the first lightguide face;

wherein the collimating reflector comprises a locus of foci (F), wherein a projection of the locus of foci (F) on a plane through the first lightguide face lies on the outer surface part.

2. The light generating system according to claim 1, wherein the light collimating reflector comprises an optical axis ($O_R$);

wherein the projection of the locus of foci (F) on the plane through the first lightguide face lies closer to the outer surface part than to the optical axis ($O_R$).

3. The light generating system according to claim 1, wherein a cross-sectional area of the second reflector side differs from the surface area (A1) of the first lightguide face by at maximum 5%.

4. The light generating system according to claim 1, wherein the lightguide comprises a central point (C), and an outer edge (OE), wherein over a first portion from C to OE, wherein with increasing radial distance from the central point (C) a density of the outcoupling elements increases; wherein the increase in density of the outcoupling elements is gradual or stepwise.

5. The light generating system according to claim 4, wherein the density of the light outcoupling elements varies via one or more of (i) a size of the light outcoupling elements and (ii) a number of the light outcoupling elements; wherein one or more of the following applies: (a) at least part of a total number of the light outcoupling elements are arranged in the lightguide, (b) at least part of the total number of the light outcoupling elements are comprised by the first lightguide face, and (c) at least part of the total number of the light outcoupling elements are comprised by the second lightguide face.

6. The light generating system according to claim 4, wherein the lightguide comprises (i) an inner lightguide part comprising the inner surface part, wherein the light outcoupling elements are arranged in the inner lightguide part with a first volume density d1v, and (ii) an outer lightguide part comprising the outer surface part, wherein the light outcoupling elements are arranged in the outer lightguide part with a second volume density d2v; wherein the density is defined as $N_v*D_{eq}/V$, wherein $N_v$ refers to the number of light outcoupling elements in the respective lightguide part, $D_{eq}$ refers to the equivalent spherical diameters of the outcoupling elements in the respective lightguide parts (450,460), and V refers to the volumes of the respective lightguide parts;

and wherein d2v/d1v≥1.5.

7. The light generating system according to claim 1, wherein the light outcoupling elements comprise reflective particles, wherein the reflective particles are arranged in the lightguide; and wherein the reflective particles have spherical equivalent diameters selected from the range of 3-30 μm.

8. The light generating system according to claim 4, wherein the light outcoupling elements are arranged on one or more of the first lightguide face and the second lightguide face; wherein the light outcoupling elements related to the inner lightguide part have a first surface density d1s, wherein the light outcoupling elements related to the outer lightguide part have a second surface density d2s; wherein the density is defined as $N_a*D_{eq}/A$, wherein $N_a$ refers to the number of the light outcoupling elements related to the respective lightguide parts, $D_{eq}$ refers to the circular equivalent diameters of the light outcoupling elements related to the respective lightguide parts and defined parallel to the first lightguide face, and A refers to the respective surface areas A11, A12; and wherein d2s/d1s≥1.5.

9. The light generating system according to claim 8, wherein the light outcoupling elements comprise reflective structures comprised by one or more of the first lightguide face and the second lightguide face; wherein the reflective structures have a circular equivalent diameters selected from the range of 0.1-5 mm.

10. The light generating system according to claim 1, wherein the first reflector side has a first circular equivalent diameter Dc1, where the second reflector side has a second circular equivalent diameter Dc2, wherein 0.5≤Dc2/Dc1≤0.95, wherein the light collimating reflector comprises a hollow reflector or a light transmissive body.

11. The light generating system according claim 1, wherein the first reflector side has a first circular equivalent diameter Dc1, wherein the light collimating reflector has a reflector height (H1), wherein 0.1≤H1/Dc1≤0.33.

12. The light generating system according to claim 1, wherein a cross-section of the reflector wall with a plane parallel to the optical axis ($O_R$), as defined in claim 2, provides a semi-parabola-like shape, wherein a rotation of the semi-parabola-like shape about an axis ($O_P$) perpendicular to the outer surface part and penetrating through the outer surface part provides a parabola-like shape having a focus (F) coincident with the locus, as defined in claim 1.

13. The light generating system according to claim 1, wherein the projection of the locus, as defined in claim 1, on the plane through the first lightguide face lies on the outer surface part; wherein the lightguide comprises one or more of PC, PMMA, and silicone, and wherein the light generating device comprises a LED; wherein the first lightguide face and the second lightguide face are configured parallel; wherein the lightguide has a cross-sectional shape selected from circular or n-gonal, wherein n is at least 4; and wherein the light generating system comprises a plurality of light generating devices configured to irradiate different parts of the side face.

14. The light generating system according to claim 1, wherein the light generating system is configured to generate system light, wherein the system light comprises the outcoupled device light; wherein the light generating system is configured to provide a beam of the system light, wherein the beam has a full width half maximum selected from the range of 10-50°.

15. A lighting device selected from the group of a lamp (1), a luminaire (2) comprising the light generating system according to claim 1.

* * * * *